US012803760B2

(12) United States Patent
Li et al.

(10) Patent No.: US 12,803,760 B2
(45) **Date of Patent: *Nov. 17, 2026**

(54) METHOD AND APPARATUS FOR TRANSMITTING UPLINK CONTROL INFORMATION

(71) Applicant: HUAWEI TECHNOLOGIES CO., LTD., Shenzhen (CN)

(72) Inventors: Hua Li, Warsaw (PL); Yongzhao Cao, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 274 days.

This patent is subject to a terminal disclaimer.

(21) Appl. No.: 18/759,595

(22) Filed: Jun. 28, 2024

(65) Prior Publication Data

US 2024/0356713 A1 Oct. 24, 2024

Related U.S. Application Data

(63) Continuation of application No. 17/940,765, filed on Sep. 8, 2022, now Pat. No. 12,068,999, which is a (Continued)

(30) Foreign Application Priority Data

Feb. 13, 2018 (CN) ......................... 201810150625.4

(51) Int. Cl.

| | |
|---|---|
| ***H04W 72/04*** | (2023.01) |
| ***H04L 1/00*** | (2006.01) |
| ***H04L 5/00*** | (2006.01) |

(52) U.S. Cl.

CPC .......... *H04L 5/0057* (2013.01); *H04L 1/0003* (2013.01); *H04L 1/0009* (2013.01); *H04L 5/0005* (2013.01)

(58) Field of Classification Search

CPC ... H04L 5/0057; H04L 1/0003; H04L 1/0009; H04L 5/0005; H04L 1/0026; H04L 1/003; (Continued)

(56) References Cited

U.S. PATENT DOCUMENTS 11,700,103 B2 * 7/2023 Li ......................... H04L 1/1671 370/330
2012/0327884 A1 12/2012 Seo et al.
(Continued)

FOREIGN PATENT DOCUMENTS

CN 102859923 1/2013
CN 102934381 2/2013
(Continued)

OTHER PUBLICATIONS

3GPP TS 38.212 V15.0.0, "3rd Generation Partnership Project; Technical Specification Group Radio Access Network; NR; Multiplexing and Channel Coding (Release 15)," Dec. 2017, 82 pages.
(Continued)

*Primary Examiner* — Brandon M Renner
(74) *Attorney, Agent, or Firm* — Fish & Richardson P.C.

(57) ABSTRACT

This application provides methods and apparatuses for transmitting channel state information (CSI). The CSI is a part of uplink control information (UCI) and includes a quantity of bits. In an implementation, a method includes: determining a threshold code rate according to a modulation and coding scheme (MCS) index when the CSI is to be transmitted on a physical uplink shared channel (PUSCH) without uplink data, determining a second quantity of bits according to the threshold code rate and the first quantity of bits, where the second quantity of bits is less than or equal to the first quantity of bits, and transmitting the second quantity of bits of the CSI on the PUSCH.

24 Claims, 11 Drawing Sheets

700

Related U.S. Application Data continuation of application No. 16/987,404, filed on Aug. 7, 2020, now Pat. No. 11,700,103, which is a continuation of application No. PCT/CN2019/074832, filed on Feb. 12, 2019.

(58) Field of Classification Search
CPC ... H04L 1/0031; H04L 1/0073; H04L 1/1671; H04W 72/04; H04W 72/21
See application file for complete search history.

(56) References Cited

U.S. PATENT DOCUMENTS

| | | | | |
|---|---|---|---|---|
| 2018/0092073 | A1 | 3/2018 | Nogami et al. | |
| 2018/0167932 | A1 | 6/2018 | Papasakellariou | |
| 2018/0376490 | A1 | 12/2018 | Lunttila et al. | |
| 2019/0089511 | A1 | 3/2019 | Saito et al. | |
| 2019/0288812 | A1 | 9/2019 | Chen et al. | |
| 2020/0337046 | A1* | 10/2020 | Gao | H04W 72/21 |
| 2020/0366352 | A1* | 11/2020 | Si | H04W 80/08 |
| 2021/0377991 | A1 | 12/2021 | Takeda et al. | |
| 2022/0377602 | A1 | 11/2022 | Kim | |

FOREIGN PATENT DOCUMENTS

| | | | | | |
|---|---|---|---|---|---|
| CN | 103053121 | | | 4/2013 | |
| CN | 106060930 | A | | 10/2016 | |
| CN | 109803404 | | | 5/2019 | |
| CN | 110034905 | A | * | 7/2019 | H04W 72/1268 |
| CN | 109921876 | B | * | 11/2020 | |
| WO | 2016163720 | A1 | | 10/2016 | |
| WO | WO 2017164626 | | | 9/2017 | |
| WO | WO 2017175818 | | | 10/2017 | |
| WO | WO 2019135597 | | | 7/2019 | |
| WO | WO 2019138016 | | | 7/2019 | |

OTHER PUBLICATIONS

3GPP TS 38.214 V15.0.0 (Dec. 2017), "3rd Generation Partnership Project; Technical Specification Group Radio Access Network; NR; Physical layer procedures for data (Release 15)," Dec. 2017, 71 pages.
3GPP TS 38.214 V2.0.0, "3rd Generation Partnership Project; Technical Specification Group Radio Access Network; NR; Physical Layer Procedures for Data," Dec. 2017, 71 pages.
3GPP TS 38.300 V1.1.0, "3rd Generation Partnership Project; Technical Specification Group Radio Access Network; NR; NR and NG-RAN Overall Description; Stage 2 (Release 15)," Oct. 2017, 59 pages.
CATR, "UCI reporting in physical uplink shared channel," 3GPP TSG RAN WG1 Meeting AH 1801, R1-1800761, Vancouver, Canada, Jan. 22-26, 2018, 7 pages.
CATT, "Open Issues for UCI multiplexing on PUSCH," 3GPP TSG RAN WG1 Meeting AH 1801, R1-1800255, Jan. 13, 2018, 9 pages.
CATT, "Open issues for UCI multiplexing on PUSCH," 3GPP TSG RAN WG1 Meeting AH 1801, R1-1800996, Vancouver, Canada, Jan. 22-26, 2018, 9 pages.
EP Communication pursuant to Article 94(3) in European Appln 19754080, dated Oct. 17, 2022, 15 pages.
EPO Communication issued in European Application No. 19754080.0 on Mar. 2, 2022, 9 pages.
Ericsson, "Corrections for CSI reporting," 3GPP TSG RAN WG1 Meeting AH 1801, R1-1800697, Vancouver, Canada, Jan. 22-26, 2018, 11 pages.
Ericsson, "Offline notes CSI reporting," 3GPP TSG-RAN WG1 #91, R1-1721672, Reno, USA, Nov. 27-Dec. 1, 2017, 2 pages.
Ericsson, "Summary of Views on CSI Reporting," 3GPP TSG-RAN WG1 #91, R1-1721378, Reno, USA, Nov. 27-Dec. 1, 2017, 9 pages.
Extended European Search Report issued in European Application No. 19754080.0 on Feb. 17, 2021, 12 pages.
Huawei, HiSilicon, "Remaining issues on UCI multiplexing," 3GPP TSG RAN WG1 Meeting #92, R1-1803257, Athens, Greece, Feb. 26-Mar. 2, 2018, 8 pages.
LG Electronics, "Text proposals on PUSCH UCI multiplexing," 3GPP TSG RAN WG1 Meeting AH 1801, R1-1800377, Vancouver, Canada, Jan. 22-26, 2018, 19 pages.
Office Action in Chinese Application No. 201810150625.4, dated May 27, 2021, 13 pages (with English translation).
Office Action issued in Chinese Application No. 201810150625.4 on Sep. 23, 2022, 4 pages.
Office Action issued in Japanese Application No. 2020-542771 on Oct. 26, 2021, 8 pages (with English translation).
Qualcomm Incorporated, "Summary of remaining issues for UCI piggyback on PUSCH," 3GPP TSG RAN WG1 Meeting AH 1801, R1-1801092, Vancouver, Canada, Jan. 22-26, 2018, 5 pages.
3GPP TS 38.213 V1.3.0, "3rd Generation Partnership Project; Technical Specification Group Radio Access Network; NR; Physical layer procedures for control (Release 15)," Dec. 2017, 58 pages.
Ericsson, "Summary of Discussions on Multiplexing Different UCI types on a PUCCH resource," 3GPP TSG RAN WG1 Meeting AH 1801, R1-1801262, Vancouver, Canada, Jan. 22-26, 2018, 27 pages.
EP Communication Pursuant to Rule 71(3) EPC in European Appln No. 19754080.0, dated Jun. 19, 2023, 75 pages.
3GPP TS 38.101-1 V15.0.0, "3rd Generation Partnership Project; Technical Specification Group Radio Access Network; NR; User Equipment (UE) radio transmission and reception; Part 1: Range 1 Standalone (Release 15)," Dec. 2017, 49 pages.
3GPP TS 38.211 V15.0.0, "3rd Generation Partnership Project; Technical Specification Group Radio Access Network; NR; Physical channels and modulation (Release 15)," Dec. 2017, 73 pages.
3GPP TS 38.213 V15.0.0, "3rd Generation Partnership Project; Technical Specification Group Radio Access Network; NR; Physical layer procedures for control (Release 15)," Dec. 2017, 56 pages.
3GPP TS 38.215 V15.0.0, "3rd Generation Partnership Project; Technical Specification Group Radio Access Network; NR; Physical layer measurements (Release 15)," Dec. 2017, 13 pages.
3GPP TS 38.321 V15.0.0, "3rd Generation Partnership Project; Technical Specification Group Radio Access Network; NR; Medium Access Control (MAC) protocol specification (Release 15)," Dec. 2017, 55 pages.
3GPP TS 38.331 V15.0.0, "3rd Generation Partnership Project; Technical Specification Group Radio Access Network; NR; Radio Resource Control (RRC) protocol specification (Release 15)," Dec. 2017, 188 pages.

* cited by examiner

METHOD AND APPARATUS FOR TRANSMITTING UPLINK CONTROL INFORMATION

CROSS-REFERENCE TO RELATED APPLICATIONS

This application is a continuation of U.S. patent application Ser. No. 17/940,765, filed on Sep. 8, 2022, which is a continuation of U.S. patent application Ser. No. 16/987,404, filed on Aug. 7, 2020, now U.S. Pat. No. 11,700,103, which is a continuation of International Application No. PCT/CN2019/074832, filed on Feb. 12, 2019, which claims priority to Chinese Patent Application No. 201810150625.4, filed on Feb. 13, 2018. All of the afore-mentioned patent applications are hereby incorporated by reference in their entireties.

TECHNICAL FIELD

This application relates to the communications field, and more specifically, to an uplink control information sending method and apparatus, and an uplink control information receiving method and apparatus.

BACKGROUND

Uplink control information (UCI) mainly includes three parts: a hybrid automatic repeat request acknowledgment (HARQ-ACK), a channel state information (CSI) part 1, and a CSI part 2. With the development of communication systems, an amount of data in the CSI part 2 has been greatly increased.

When scheduling a resource for UCI transmission, a base station may not be able to obtain the amount of data in the CSI part 2 in advance. Consequently, the scheduled resource may be insufficient. In this case, the CSI part 2 cannot be effectively carried on an allocated resource. Therefore, a part or all of the amount of data in the CSI part 2 would have to be discarded. In an existing technical solution, for example, a code rate threshold of the CSI part 2 is obtained according to a code rate of uplink data and a value β. The data of CSI part 2 is discarded according to a priority until a code rate of the CSI part 2 is lower than the threshold. However, when there is no uplink data, how to effectively carry data of the CSI part 2 on a limited resource still needs to be studied.

SUMMARY

This application provides an uplink control information (UCI) sending method and apparatus, and an UCI receiving method and apparatus, to ensure effective sending of UCI data, thereby improving resource utilization.

According to a first aspect, a communication method is provided. The method includes:

- determining a threshold code rate according to a modulation and coding scheme (MCS) index; determining a quantity of bits of to-be-transmitted UCI according to the threshold code rate and a quantity of generated bits of UCI, where the quantity of bits of the to-be-transmitted UCI is less than or equal to the quantity of generated bits of the UCI; and sending the to-be-transmitted UCI.

According to the foregoing technical solution, when only the UCI is to be transmitted on a physical uplink channel, a terminal device may discard a part of the UCI, such as a part or all of a CSI part 2, according to a resource allocated by a network device, and send only a quantity of bits of UCI that can be effectively carried. Therefore, the terminal device can properly allocate a resource, to ensure effective sending of UCI data. In addition, when the physical uplink channel has sufficient resources, the terminal device may further send the UCI and uplink data concurrently on the physical uplink channel, to improve resource utilization. Overall, this helps improve transmission performance of a communications system.

With reference to the first aspect, in some implementations of the first aspect, the determining a threshold code rate according to an MCS index includes:

- if the MCS index falls within a first range, determining a first code rate according to the MCS index and a predefined one-to-one correspondence between the MCS index and the first code rate; and determining the first code rate as the threshold code rate; or determining the threshold code rate according to the first code rate and an offset β, where the offset β is greater than or equal to 1.

Optionally, the first range is an interval in which the MCS index is greater than or equal to 0 and less than 28.

Specifically, for example, when a value of the MCS index ranges from 0 to 27 (including 0 and 27), the correspondence between the MCS index and the first code rate may be defined by using a protocol. The MCS index and the first code rate are in a one-to-one correspondence, one code rate corresponding to one MCS index is used as a first code rate for calculating a code rate threshold, and then a threshold code rate is obtained. In this way, a part of the UCI, such as a part or all of a CSI part 2, may be discarded according to a resource allocated by a network device, and only a quantity of bits of UCI that can be effectively carried is sent, thereby improving resource utilization. This helps improve transmission performance of the communications system.

With reference to the first aspect and the foregoing implementations, in some possible implementations, the determining a threshold code rate according to an MCS index includes:

- if the MCS index falls within a second range, determining a modulation order according to the MCS index, and determining a first code rate according to a correspondence between the modulation order and the first code rate; and
- determining the first code rate as the threshold code rate; or
- determining the threshold code rate according to the first code rate and an offset β, where the offset β is greater than or equal to 1.

With reference to the first aspect and the foregoing implementations, in some possible implementations, the determining a first code rate according to a correspondence between the modulation order and the first code rate includes:

- if the modulation order corresponds to a plurality of first code rates, determining a largest code rate in the plurality of first code rates as the first code rate; or
- if the modulation order corresponds to a plurality of first code rates, determining a smallest code rate in the plurality of first code rates as the first code rate; or
- if the modulation order corresponds to a plurality of first code rates, determining the first code rate according to first indication information.

Optionally, when the value of the MCS index ranges from 28 to 31 (including 28 and 31), the first code rate may be determined by defining a correspondence between the MCS index and the modulation order and then according to the correspondence between the modulation order and the code rate. It should be noted herein that the modulation order has four values: 1, 2, 4, and 6, and each value corresponds to a plurality of code rates. Optionally, if the modulation order corresponds to a plurality of code rates, a largest or smallest code rate in the plurality of code rates is determined as the first code rate. Alternatively, the first indication information carried in downlink control information (DCI) is used to indicate a code rate as the first code rate. In this way, transmission efficiency can be improved, and resource utilization can be improved. This helps improve transmission performance of the communications system.

With reference to the first aspect and the foregoing implementations, in some possible implementations, the determining a threshold code rate according to an MCS index includes:

- if the MCS index falls within a second range, determining a first code rate according to the MCS index and a predefined one-to-one correspondence between the MCS index and the first code rate; and
- determining the first code rate as the threshold code rate; or
- determining the threshold code rate according to the first code rate and an offset β, where the offset β is greater than or equal to 1.

Optionally, the second range is an interval in which the MCS index is greater than 28.

Currently, if the value of the MCS index ranges from 28 to 31 (including 28 and 31), it is defined as a data retransmission case. In this embodiment of this application, the one-to-one correspondence between the MCS index and the first code rate in the second range is defined by using a protocol, to determine the first code rate. In this way, transmission efficiency can be improved, and resource utilization can be improved. This helps improve transmission performance of the communications system.

With reference to the first aspect and the foregoing implementations, in some possible implementations, the method further includes: determining whether only the UCI is to be transmitted on the physical uplink channel.

Specifically, a resource scheduled by DCI from a network device may be used to transmit data and/or the UCI, and the network device needs to make the terminal device learn whether uplink data needs to be transmitted. If only the UCI is transmitted, and no uplink data needs to be transmitted, the terminal device does not generate a TB, but allocates all resources to the UCI. If both the uplink data and the UCI are transmitted, the terminal device needs to allocate resources to both the uplink data and the UCI.

Optionally, it is determined, according to second indication information, whether only the UCI is to be transmitted on the physical uplink channel, where the second indication information is information carried in the DCI, or

- it is determined, according to the MCS index, a redundancy version (RV) indicator, and a new data indicator (NDI), whether only the UCI is to be transmitted on the physical uplink channel.

According to the foregoing technical solution, it is determined that only the UCI is to be transmitted on the physical uplink channel, by using, for example, indication information carried in the DCI, which may be, for example, indication information of 1 bit, or alternatively the MCS index, a redundancy version (RV) indicator, and a new data indicator (NDI). When it is determined that the terminal device sends only the UCI, all resources are allocated to the terminal device to transmit the UCI, to improve transmission efficiency, and improve resource utilization. This helps improve transmission performance of the communications system.

According to a second aspect, a communication method is provided. The method includes:

- determining a threshold code rate according to an MCS index; determining a quantity of bits of to-be-received UCI according to the threshold code rate and a quantity of generated bits of UCI, where the quantity of bits of the to-be-received UCI is less than or equal to the quantity of generated bits of the UCI; and receiving the to-be-received UCI.

According to the foregoing technical solution, when only the UCI is to be transmitted on the physical uplink channel, a network device may determine, according to an allocated resource, that a terminal device discards a part of the UCI, such as a part or all of a CSI part 2, so that the network device can effectively receive a quantity of bits of the UCI. This helps improve data transmission reliability, and therefore improve resource utilization. Overall, this helps improve transmission performance of a communications system.

With reference to the second aspect, in some possible implementations, the determining a threshold code rate according to an MCS index includes:

- if the MCS index falls within a first range, determining a first code rate according to a predefined one-to-one correspondence between the MCS index and the first code rate; and
- determining the first code rate as the threshold code rate; or
- determining the threshold code rate according to the first code rate and an offset β, where the offset β is greater than or equal to 1.

Optionally, the first range is an interval in which the MCS index is greater than or equal to 0 and less than 28.

With reference to the second aspect and the foregoing implementations, in some possible implementations, the determining a threshold code rate according to an MCS index includes: if the MCS index falls within a second range, determining a modulation order according to the MCS index, and determining a first code rate according to a correspondence between the modulation order and the first code rate; and

- determining the first code rate as the threshold code rate; or
- determining the threshold code rate according to the first code rate and an offset β, where the offset β is greater than or equal to 1.

Optionally, if the modulation order corresponds to a plurality of first code rates, a largest code rate in the plurality of first code rates is determined as the first code rate; or

- if the modulation order corresponds to a plurality of first code rates, a smallest code rate in the plurality of first code rates is determined as the first code rate; or
- if the modulation order corresponds to a plurality of first code rates, the first code rate is determined according to first indication information.

With reference to the second aspect and the foregoing implementations, in some possible implementations, the determining a threshold code rate according to an MCS index includes: when the MCS index falls within a second range, determining a first code rate according to a predefined one-to-one correspondence between the MCS index and the first code rate;

determining the first code rate as the threshold code rate; or determining the threshold code rate according to the first code rate and an offset β, where the offset β is greater than or equal to 1.

Optionally, the second range is an interval in which the MCS index is greater than 28.

With reference to the second aspect and the foregoing implementations, in some possible implementations, the method further includes: determining whether only the UCI is received on the physical uplink channel.

Optionally, it is determined, according to second indication information, whether only the UCI is received on the physical uplink channel, where the second indication information is information carried in the DCI, or it is determined, according to the MCS index, a redundancy version (RV) indicator, and a new data indicator (NDI), whether only the UCI is received on the physical uplink channel.

When only the UCI is to be transmitted on the physical uplink channel, the terminal device may discard a part of the UCI, such as a part or all of a CSI part 2, according to a resource allocated by the network device, and send only a quantity of bits of UCI that can be effectively carried. Therefore, the terminal device can properly allocate a resource, to ensure effective sending of UCI data. In addition, when the physical uplink channel has sufficient resources, the terminal device may further send the UCI and uplink data concurrently on the physical uplink channel, to improve resource utilization. Overall, this helps improve transmission performance of a communications system.

According to a third aspect, a terminal device is provided. The terminal device has functions of implementing the terminal device in the foregoing method design in the first aspect. The functions may be implemented by hardware, or may be implemented by executing corresponding software by hardware. The hardware or the software includes one or more units corresponding to the foregoing functions.

According to a fourth aspect, a network device is provided. The network device has functions of implementing the network device in the foregoing method design in the second aspect. The functions may be implemented by hardware, or may be implemented by executing corresponding software by hardware. The hardware or the software includes one or more units corresponding to the foregoing functions.

According to a fifth aspect, a terminal device is provided. The terminal device includes a transceiver, a processor, and a memory. The processor is configured to control the transceiver to receive and send a signal, the memory is configured to store a computer program, and the processor is configured to invoke the computer program from the memory and run the computer program, so that the terminal device performs the method in the first aspect or any possible implementation of the first aspect.

According to a sixth aspect, a network device is provided. The network device includes a transceiver, a processor, and a memory. The processor is configured to control the transceiver to receive and send a signal, the memory is configured to store a computer program, and the processor is configured to invoke the computer program from the memory and run the computer program, so that the network device performs the method in the second aspect or any possible implementation of the second aspect.

According to a seventh aspect, a communications apparatus is provided. The communications apparatus may be the terminal device in the foregoing method designs, or may be a chip disposed in the terminal device. The communications apparatus includes: a processor, coupled to a memory and configured to execute instructions in the memory, to implement the method performed by the terminal device in the first aspect and any possible implementation of the first aspect. Optionally, the communications apparatus further includes the memory. Optionally, the communications apparatus further includes a communications interface, and the processor is coupled to the communications interface.

According to an eighth aspect, a communications apparatus is provided. The communications apparatus may be the network device in the foregoing method designs, or may be a chip disposed in the network device. The communications apparatus includes: a processor, coupled to a memory and configured to execute instructions in the memory, to implement the method performed by the network device in the second aspect and any possible implementation of the second aspect. Optionally, the communications apparatus further includes the memory. Optionally, the communications apparatus further includes a communications interface, and the processor is coupled to the communications interface.

According to a ninth aspect, a computer program product is provided. The computer program product includes computer program codes. When the computer program codes run on a computer, causing the computer to perform the methods in the foregoing aspects.

According to a tenth aspect, a computer readable medium is provided. The computer readable medium stores program codes. When the computer program codes run on a computer, causing the computer to perform the methods in the foregoing aspects.

According to an eleventh aspect, a chip system is provided. The chip system includes a processor that is configured to support a terminal device to implement functions in the foregoing aspects, for example, generating, receiving, determining, sending, or processing data and/or information in the foregoing methods. In a possible design, the chip system further includes a memory, and the memory is configured to store program instructions and data that are necessary for the terminal device. The chip system may include a chip, or may include a chip and another discrete device.

According to a twelfth aspect, a chip system is provided. The chip system includes a processor that is configured to support a network device to implement functions in the foregoing aspects, for example, generating, receiving, determining, sending, or processing data and/or information in the foregoing methods. In a possible design, the chip system further includes a memory, and the memory is configured to store program instructions and data that are necessary for the network device. The chip system may include a chip, or may include a chip and another discrete device.

DESCRIPTION OF EMBODIMENTS

Figure 1:
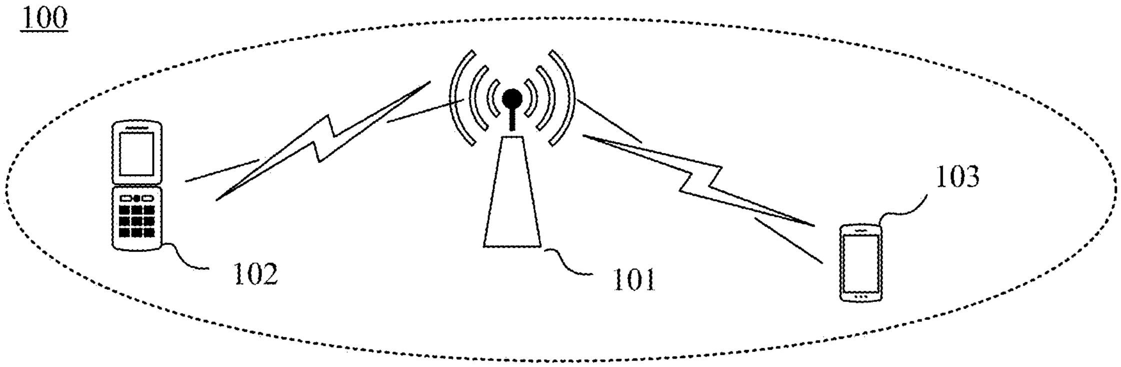
FIG. 1 is a schematic diagram of an example of a communications system.

Terms such as "component", "module", and "system" used in this application indicate computer-related entities, such as hardware, firmware, combinations of hardware and software, software being stored, or software being executed. For example, a component may be, but is not limited to, a process that is run on a processor, a processor, an object, an executable file, a thread of execution, or a program. One or more components may reside within a process and/or a thread of execution, or a component may be located in one computer or distributed among two or more computers. In addition, these components may be executed from various computer readable mediums that store various data structures. The components may communicate by using a local and/or remote process and according to, for example, a signal having one or more data packets (for example, data from two components interacting with another component in a local system, a distributed system, and/or across a network such as the Internet interacting with other systems by using a signal).

It should be noted that in embodiments of this application, a "protocol" may be a standardized protocol in the communications field, for example, may include a long term evolution (LTE) protocol, a new radio (NR) protocol, and a protocol to be used in a related future communications system. This is not limited in this application.

It should be further understood that in the embodiments of this application, "predefining" may be implemented by prestoring corresponding codes or tables in a device (for example, a terminal device or a network device), or using another manner of indicating related information. Specific implementations of the "predefining" are not limited in this application. For example, a "predefined" value may be a value "defined in a protocol".

It should be further noted that in the embodiments of this application, nouns "network" and "system" are often interchangeably used, and their meanings are commonly understood. The terms "information", "signal", "message", and "channel" may be interchangeably used occasionally. The expressed meanings are consistent when differences are not emphasized. The terms "of", "relevant", and "corresponding" may be interchangeably used occasionally. The expressed meanings are consistent when differences are not emphasized.

It should be further noted that in the embodiments of this application, terms "report" and "feed back" are often interchangeably used, and their meanings are commonly understood. Actually, for a terminal device, reporting CSI and feeding back CSI may both mean substantially sending CSI by using a physical uplink channel. Therefore, in the embodiments of this application, expressed meanings are consistent when differences are not emphasized.

It should be further noted that the term "and/or" describes an association relationship between associated objects and indicates that three relationships may exist. For example, A and/or B may represent the following three cases: only A exists, both A and B exist, and only B exists. Except in a mathematical formula, the character "/" placed between two objects generally indicates an "or" relationship between the associated objects. "At least one" means one or more than one. "At least one of A and B", similar to "A and/or B", describes an association relationship between associated objects and indicates that three relationships may exist: only A exists, both A and B exist, and only B exists.

The following describes the technical solutions provided in this application in detail with reference to the accompanying drawings.

The technical solutions presented in the embodiments of this application may be applied to various communication systems, such as global system for mobile communications (GSM) systems, code division multiple access (CDMA) systems, wideband code division multiple access (WCDMA) systems, general packet radio service (GPRS) systems, long term evolution (LTE) systems, LTE frequency division duplex (FDD) systems, LTE time division duplex (TDD) systems, universal mobile telecommunications systems (UMTS), worldwide interoperability for microwave access (WiMAX) communications systems, future 5th generation (5G) communication systems, or new radio (NR) systems.

FIG. 1 is a schematic diagram of a wireless communications system 100. As shown in FIG. 1, the wireless communications system 100 may include one or more network devices, for example, a network device 101. The wireless communications system 100 may further include one or more terminal devices, for example, a first terminal device 102 and a second terminal device 103. The wireless communications system 100 may support coordinated multipoint (COMP) transmission. This means a plurality of cells or a plurality of network devices may participate in data transmission to one terminal device in coordination or jointly receive data transmitted by one terminal device, or a plurality of cells or a plurality of network devices perform coordinated scheduling or coordinated beam forming. The plurality of cells may belong to a same network device or different network devices, and may be selected according to channel gain or path loss, received signal strength, received signal instruction, and the like.

It should be understood that a network device in the wireless communications system may be any device that has a wireless receiving/transmitting functions, or a chip that is disposed in the device and performs the receiving/transmitting functions. Examples of the network device include but is not limited to: an evolved Node B (eNB), a radio network controller (RNC), a Node B (NB), a base station controller (BSC), a base transceiver station (BTS), a home evolved NodeB or home Node B (HNB), a baseband unit (BBU), an access point (AP) in a wireless fidelity (WiFi) system, a wireless relay node, a wireless backhaul node, a transmission point (TP), or a transmission and reception point (TRP), or may be a gNB or a transmission point (TRP or TP) in a 5G system such as an NR system, or an antenna panel or a group of antenna panels (including a plurality of antenna panels) of a base station in a 5G system, or may be a network node that forms a gNB or a transmission point, such as a baseband unit (BBU) or a distributed unit (DU).

In some deployments, the gNB may include a centralized unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information of the RRC layer eventually becomes information of the PHY layer, or is converted from information of the PHY layer. Therefore, in this architecture, higher layer signaling, such as RRC layer signaling or PDCP layer signaling, may also be considered as being sent by the DU or sent by the DU and the RU. It may be understood that the network device may be a CU node, a DU node, or a device including a CU node and a DU node. In addition, the CU may be classified into a network device in a radio access network (RAN), or the CU may be classified into a network device in a core network (CN). This is not limited herein.

It should be further understood that the terminal device in the wireless communications system may alternatively be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in this embodiment of this application may be a mobile phone a tablet computer (Pad), a computer with a wireless receiving/sending function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in this embodiment of this application. In this application, the foregoing terminal device and the chip that may be disposed in the foregoing terminal device are collectively referred to as a terminal device.

Optionally, in the communications system 100 shown in FIG. 1, the network device may be a serving network device, and the serving network device may be a network device that provides, by using a wireless air interface protocol, at least one service of an RRC connection, non-access stratum (NAS) mobility management, and security input for the terminal device. Optionally, the network device may alternatively be a coordinated network device. The serving network device may send control signaling to the terminal device, and the coordinated network device may send data to the terminal device. Alternatively, the serving network device may send control signaling to the terminal device, and the serving network device and the coordinated network device may send data to the terminal device. Alternatively, both the serving network device and the coordinated network device may send control signaling to the terminal device, and both the serving network device and the coordinated network device may send data to the terminal device. Alternatively, the coordinated network device may send control signaling to the terminal device, and at least one of the serving network device and the coordinated network device may send data to the terminal device. Alternatively, the coordinated network device may send control signaling and data to the terminal device. This is not particularly limited in this embodiment of this application.

It should be understood that FIG. 1 shows only an example of the network device and the terminal device for ease of understanding. However, this should not constitute any limitation on this application. The wireless communications system may further include more or fewer network devices, or may include more terminal devices. Network devices that communicate with different terminal devices may be a same network device, or may be different network devices. Quantities of network devices that communicate with different terminal devices may be the same, or may be different. This is not limited in this application.

For ease of understanding the embodiments of this application, the following first briefly describes several nouns or terms used in this application.

1. Physical uplink channel: The physical uplink channel is a channel that may be used to carry UCI and/or uplink data. For example, the physical uplink channel may include a physical uplink control channel (PUCCH) and a physical uplink shared channel (PUSCH) that are defined in an LTE protocol or an NR protocol, and another uplink channel that has the foregoing function and that is defined as a network evolves.
2. Uplink control information (UCI): The UCI may be used to carry at least one of channel state information (CSI), an acknowledgment (ACK)/a negative acknowledgement (NACK), and an uplink scheduling request (SR).
3. Downlink control information (DCI): The downlink control information is mainly used to send downlink scheduling assignment information and has a plurality of different formats, including DCI formats 1, 1A, 1B, 1C, 1D, 2, 2A, 2B, and 2C.
4. Resource element (RE): The resource element may correspond to one symbol in time domain, and may correspond to one subcarrier in frequency domain. In the embodiments of this application, the RE may be an example of a resource unit.
5. Resource block (RB): One RB occupies $$N_{sc}^{RB}$$

consecutive subcarriers in frequency domain.

$$N_{sc}^{RB}$$

is a positive integer. For example, in an LTE protocol, $$N_{sc}^{RB}$$

may be equal to 12. In the embodiments of this application, an RB may be defined only from a frequency domain resource. In other words, a quantity of time domain resources occupied by the RB in time domain is not limited. In the embodiments of this application, the RB may be another example of a resource unit.

The following describes in detail a transmission object (namely, uplink control information (UCI)) in the embodiments of this application.

In the embodiments of this application, the UCI includes: an HARQ-ACK, an SR, and CSI (a channel quality indicator (CQI), a precoding matrix indicator (PMI), and rank indication (RI) information).

By way of example, and not limitation, the UCI in the embodiments of this application may include but is not limited to one or more of the following information items:

1. Feedback Information

In the embodiments of this application, the UCI may include feedback information for downlink data.

Specifically, in the embodiments of this application, a feedback technology may be used for downlink data transmission. By way of example, and not limitation, the feedback technology may include, for example, a hybrid automatic repeat request (HARQ) technology.

The HARQ technology is a technology including a combination of forward error correction (FEC) coding and an automatic repeat request (ARQ).

For example, in the HARQ technology, after receiving data from a transmit end, a receive end may determine whether the data is accurately decoded. If the data cannot be accurately decoded, the receive end may feed back negative acknowledgment (NACK) information to the transmit end, so that the transmit end can determine, according to the NACK information, that the receive end did not accurately receive the data, and retransmission processing can be performed. If the data can be accurately decoded, the receive end may feed back acknowledgment (ACK) information to the transmit end, so that the transmit end can determine, according to the ACK information, that the receive end has accurately received the data, and it can be determined that the data transmission is completed.

In other words, in the embodiments of this application, when decoding succeeds, the receive end may feed back the ACK information to the transmit end, and when decoding fails, the receive end may feed back the NACK information to the transmit end.

By way of example, and not limitation, in the embodiments of this application, the UCI may include the ACK information or the NACK information in the HARQ technology. The HARQ-ACK is used to feed back a receiving status of a downlink data channel PDSCH. When correctly receiving the downlink data channel PDSCH, a terminal device sends an ACK. When incorrectly receiving the PDSCH, the terminal device sends an NACK. The base station determines, according to feedback information of the terminal device for the PDSCH, a following scheduling policy, for example, a retransmission or a new transmission.

It should be understood that the foregoing enumerated content included in the feedback information is merely an example for description, and this application is not limited thereto. Other information that can indicate a status of receiving downlink data by the terminal device shall fall within the protection scope of this application. For example, the feedback information may further include discontinuous transmission (DTX) information, and the DTX information may be used to indicate that the terminal device receives no downlink data.

2. Channel State Information (CSI)

In the field of wireless communications, the CSI is a channel attribute of a communications link. The CSI is channel state information that is fed back by the terminal device to a base station after the terminal device measures a channel state, and the information further includes information such as a CQI, a PMI, or RI. It describes an attenuation status of a signal on each transmission path, that is, a value of each element in a channel gain matrix H, such as signal scattering, environment fading (multipath fading or shadowing fading), power decay of distance, and other information. The CSI may enable a communications system to adapt to a current channel condition, thereby providing assurance for high-reliability and high-rate communication in a multi-antenna system.

3. Channel Quality Indicator (CQI) Information

In the embodiments of this application, the CQI may be used to reflect channel quality of a physical downlink shared channel (PDSCH). The CQI is channel quality indicator information, and is used to directly feed back channel quality. The base station may further determine, according to the CQI, a modulation and coding scheme (MCS) used for sending data. When a value of a fed-back CQI is high, a relatively high modulation and coding scheme and a relatively high code rate may be used to carry more information on a limited resource, to improve a data transmission rate. When the value of the fed-back CQI is relatively low, a relatively low modulation and coding scheme and a relatively low code rate may be used to transmit data by using more time-frequency resources, thereby improving data transmission reliability. In addition, the terminal device measures CQIs of different frequency domain resources, so that the base station can schedule data on a frequency domain resource with desirable channel quality, to obtain a frequency domain scheduling gain.

By way of example, and not limitation, in the embodiments of this application, 0 to 15 may be used to indicate channel quality of a PDSCH. 0 indicates that the channel quality is the worst, and 15 indicates that the channel quality is the best.

In the embodiments of this application, the terminal device may send CQI information to the network device on a physical uplink control channel (PUCCH) or a physical uplink shared channel (PUSCH). The network device may determine a radio channel condition of a current PDSCH or PUSCH according to the CQI information, to perform scheduling for the PDSCH. For example, in the embodiments of this application, the network device may determine, according to the CQI information, adaptive modulation and coding (AMC), a modulation and coding scheme (MCS), a code rate or an amount of data of uplink transmission or downlink transmission, or the like.

4. Rank Indication (RI) Information

In the embodiments of this application, the RI is rank indication information and is used to feed back, to the base station, a quantity of layers that can be separated from a channel. A larger quantity of layers indicates a larger amount of data that can be simultaneously transmitted. The RI information may be used to indicate a quantity of valid data layers of the PDSCH, or the RI information may be used to indicate a quantity of code words (CW) that can be currently supported by the terminal device.

5. Precoding Matrix Indicator (PMI) Information

In the embodiments of this application, the PMI information may be used to indicate an index of a codebook set. The PMI is a precoding matrix index that is used to send data and that is fed back by the terminal device to the base station according to measured channel quality. The base station may determine a corresponding precoding matrix according to the fed-back PMI information. That is, in a multi-antenna technology such as a multiple-input multiple-output (MIMO) technology, precoding processing according to a precoding matrix is performed in baseband processing at a PDSCH physical layer. The terminal device may indicate the precoding matrix by using the PMI information, so that signal quality of a PDSCH can be improved.

In addition, there is some information such as CSI-RS resource indication information (CRI), used for feeding back, to the base station, a measurement resource that has best channel quality of measurement and that is in a plurality of measured measurement resources.

It should be understood that the foregoing enumerated specific content of the CSI is merely an example for description, and should not constitute any limitation on this application. CSI sent by a receive end device to a transmit end device may include one or more of the foregoing examples, or may further include other information that is used to represent the CSI and that is besides the foregoing examples. This is not limited in this application.

Without loss of generality, the following describes the embodiments of this application in detail by using an interaction process between one terminal device and one network device as an example. The terminal device may be any terminal device that is in a wireless communications system and that has a wireless connection relationship with one or more network devices. It may be understood that any terminal device in the wireless communications system may implement wireless communication according to a same technical solution. This is not limited in this application.

In the embodiments of this application, sending UCI may be sending data or information carried on an uplink control channel PUCCH or an uplink shared channel PUSCH. The data or information may be data or information obtained after channel coding. This is not limited in this application.

Likewise, in the embodiments of this application, sending downlink control information may be sending data or information carried on a downlink control channel (PDCCH) or a downlink shared channel PDSCH. The data or information may be data or information obtained after channel coding. This is not limited in this application.

UCI may be transmitted by using two channels: a PUCCH and a PUSCH. In the Third Generation Partnership Project (3GPP) Release 15, simultaneous transmission of a PUCCH and a PUSCH is not supported. Therefore, when the terminal device needs to send both control information and data, the UCI needs to be carried on a PUSCH for transmission. When only UCI needs to be sent, a PUCCH may be used to transmit the UCI, or all resources on a PUSCH channel may be allocated to the UCI, so that no data is sent. Specifically, when the UCI is multiplexed on the PUSCH, different processing manners are used for different information.

Figure 2:
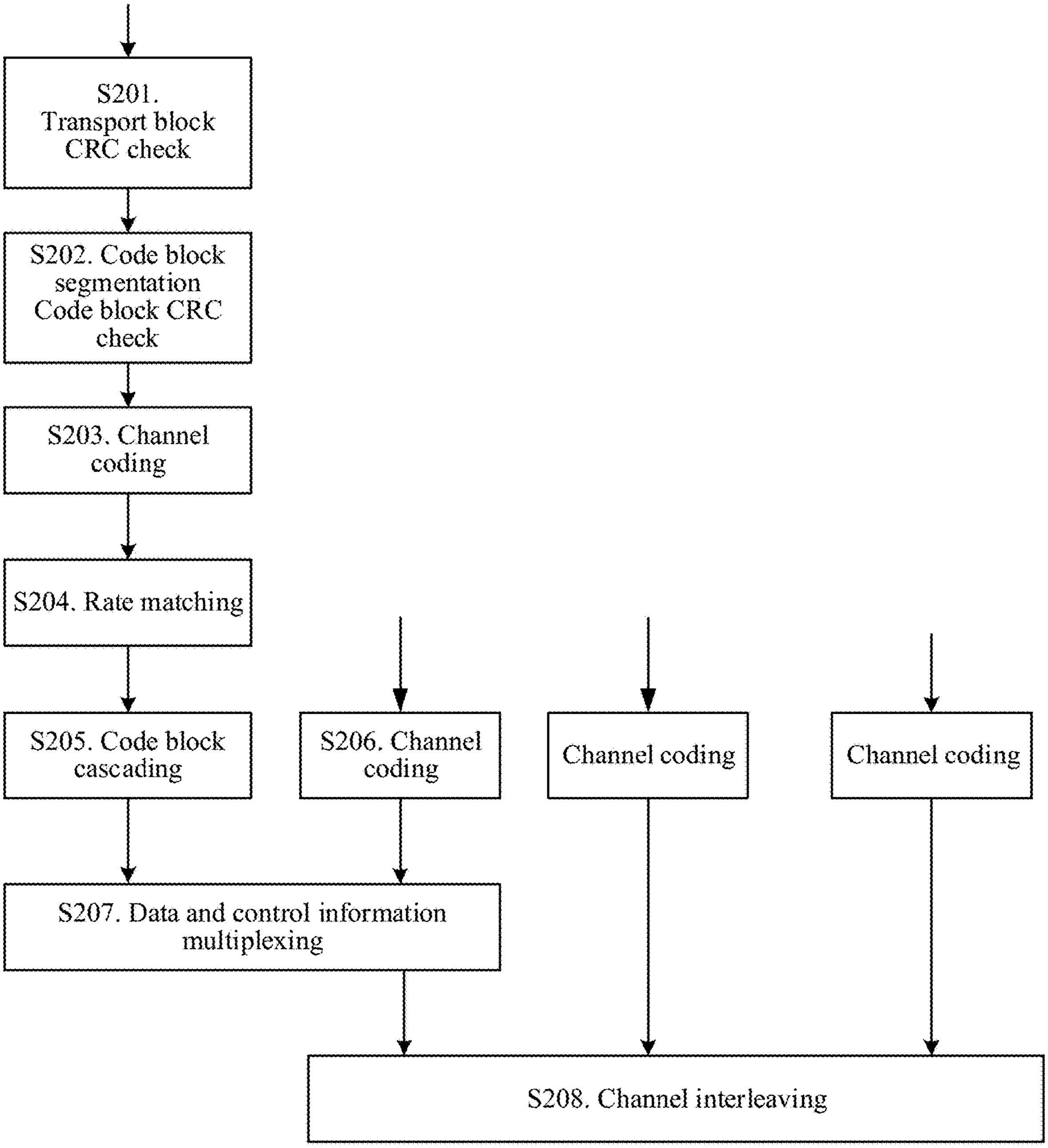
FIG. 2 is a schematic diagram of an example of an information processing manner according to an embodiment of this application.

Description in a current protocol is shown in FIG. 2.

First, for data transmission, the terminal device generates a transport block (TB) from a media access control (MAC) layer, and performs cyclic redundancy check (CRC) attachment on the TB according to S201. Then, code block (CB) segmentation and CRC attachment on each code block are performed according to S202, and then, S203 is performed for encoding in an encoder. After the encoding, rate matching is performed according to S204 on encoded data according to an actual quantity of time-frequency resources. Cascading of code blocks is performed according to S205 after the rate matching, to obtain a bit stream of a string of data by mergence.

Then, for transmission of the UCI, a CQI needs to be multiplexed with data after the CQI is encoded. After the ACK and the RI are encoded, the ACK and the RI enter an interleaver together with the CQI/data. The ACK enters the interleaver by means of data puncturing, the ACK is located at a location next to a pilot of the PUSCH, and the RI is located at a location next to the ACK, and a rate matching method is used. It is considered for such placement that the ACK may have relatively good channel estimation performance, and the RI facilitates correct reception of the CQI/PMI to a certain extent.

Figure 3:
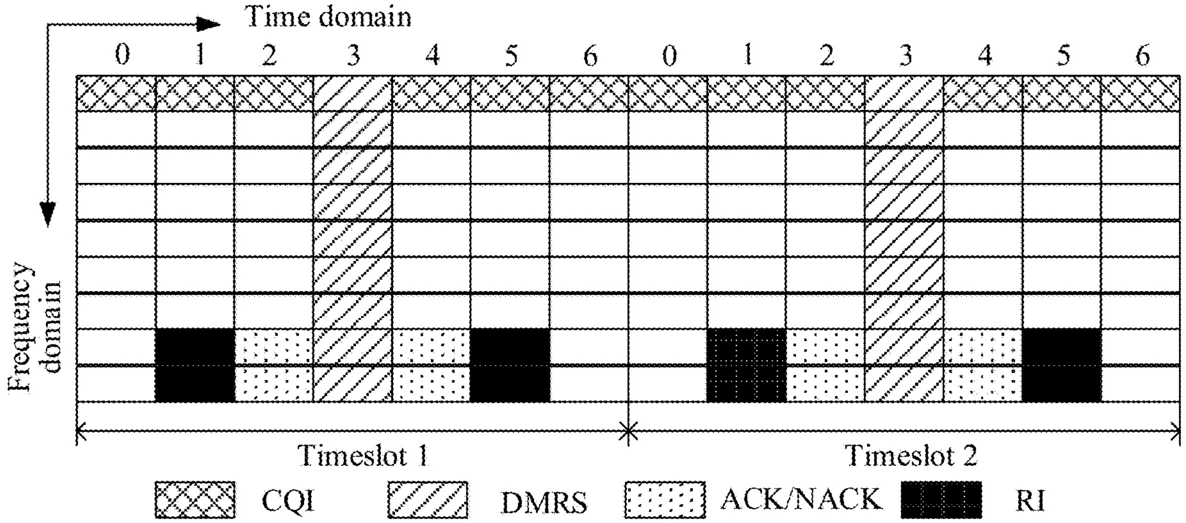
FIG. 3 is a schematic diagram of an example of resource mapping according to an embodiment of this application.

FIG. 3 is a schematic diagram of information interleaving according to a protocol. Specific interleaving mapping of information is shown in FIG. 3. In FIG. 3, there are 14 symbols. The ACK/NACK is mapped to four symbols as shown in black dot areas in the figure, and is mapped row by row from bottom to top first in time domain and then in frequency domain. The RI is mapped to four symbols on next to the ACK/NACK, and is mapped row by row from bottom to top first in time domain and then in frequency domain. After the CQI and the data are multiplexed, the CQI and the data are mapped row by row from top to bottom first in time domain and then in frequency domain. Time-frequency resources marked in white are allocated to the data.

Figure 4:
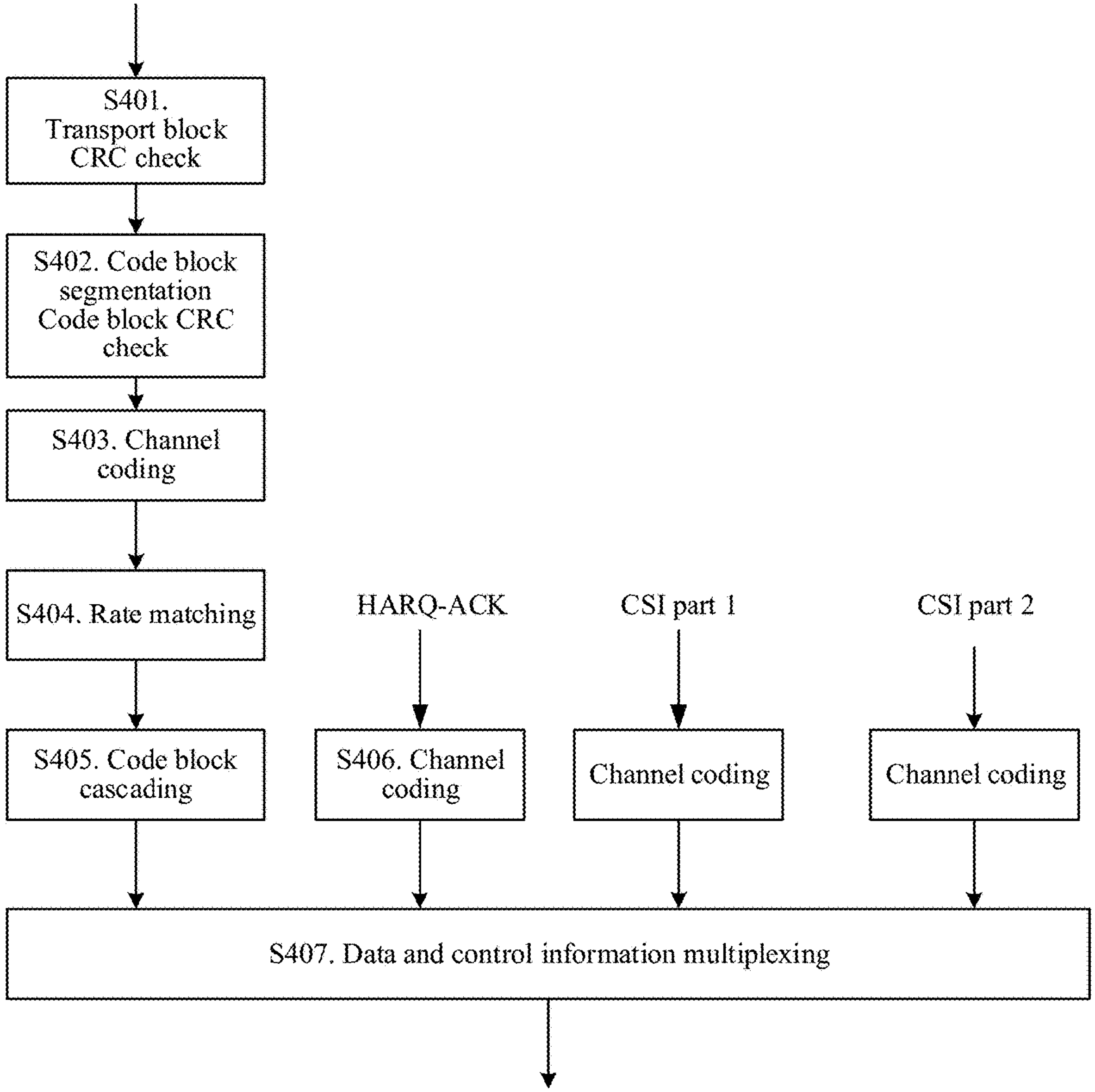
FIG. 4 is a schematic diagram of another example of an information processing manner according to an embodiment of this application.

In another possible protocol, a specific procedure and a resource mapping manner are different. A possible procedure manner is shown in FIG. 4. The following describes the possible protocol procedure and the resource mapping manner with reference to FIG. 4 and FIG. 5.

First, for data transmission, terminal device generates a transport block (TB) from a MAC layer, and performs CRC attachment on the TB according to an operation of S401. Then, code block (CB) segmentation and CRC attachment on each code block shown in S402 are performed, and then, S403 is performed for encoding in an encoder. After the encoding, rate matching is performed according to S404 on encoded data according to an actual quantity of time-frequency resources. Cascading of code blocks of S405 is performed after the rate matching, to obtain a bit stream of a string of data by mergence.

Then, for transmission of the UCI, the UCI needs to be multiplexed with data. After the HARQ-ACK is encoded, the HARQ-ACK is multiplexed with a CSI-part 1 and a CSI part 2.

Figure 5:
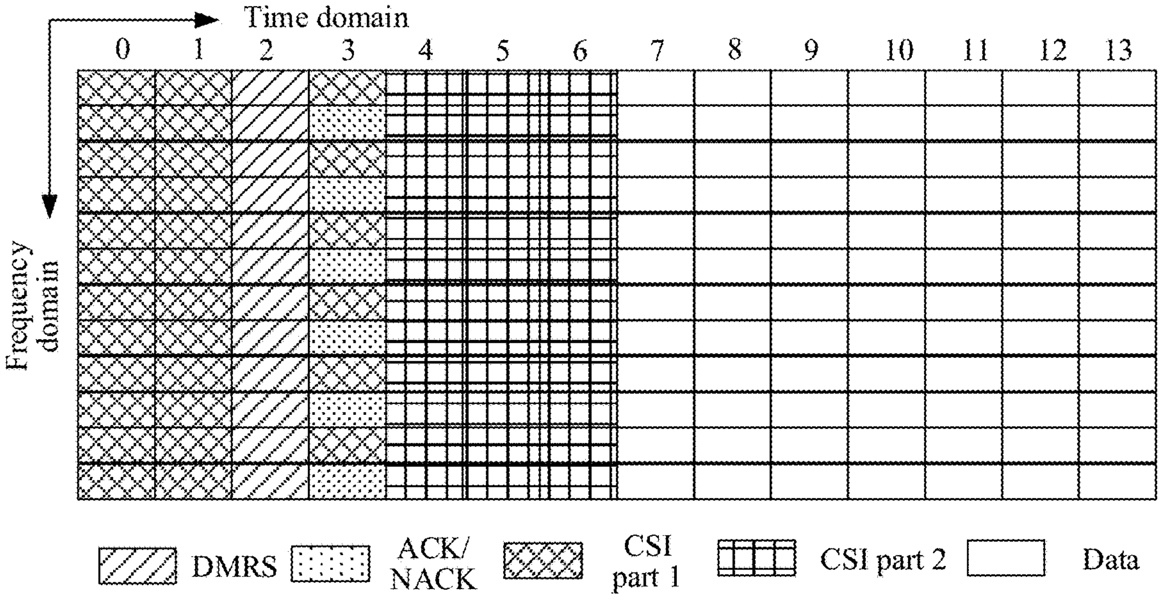
FIG. 5 is a schematic diagram of another example of resource mapping according to an embodiment of this application.

A possible mapping manner is shown in FIG. 5. In a specific mapping process, HARQ-ACK information is mapped to a first non-DMRS symbol following the DMRS (demodulation reference signal). The CSI part 1 and the CSI part 2 are mapped starting from a first non-DMRS symbol. When mapping is performed on a symbol, a specific mapping rule is as follows:

Assuming that a quantity of available REs on the symbol is B, and a quantity of remaining symbols of UCI is A, mapping is performed in a manner of distributed mapping in frequency domain.

If A>B, an RE distance in frequency domain during mapping is d=1, in other words, continuous mapping is performed in frequency domain.

If A<B, an RE distance in frequency domain during mapping is d=floor (A/B).

For example, if a quantity of REs of the HARQ-ACK in the figure is 6, and a quantity of available REs on a symbol 3 is 12, d=floor (12/6)=2, in other words, an RE of an HARQ-ACK is mapped at an interval of one RE in frequency domain.

When the CSI part 1 is mapped, available REs are obtained by removing REs to which the HARQ-ACK has been mapped.

When the CSI part 2 is mapped, available REs are obtained by removing REs to which the HARQ-ACK and the CSI part 1 have been mapped.

It should be noted that when HARQ-ACK information has different information bits, different operation manners are needed. When the HARQ-ACK information is less than 2 bits, a puncturing manner is used during resource mapping. When the HARQ-ACK information is greater than 2 bits, a rate matching manner is used during resource mapping. When the puncturing manner is used, a resource reservation manner is introduced to prevent an RE of the HARQ-ACK from occupying a resource of the CSI part 1. Specifically, when the HARQ-ACK is less than or equal to 2 bits, regardless of an actual quantity of bits of the HARQ-ACK, a resource of the HARQ-ACK is reserved according to the 2 bits, and the CSI-part 1 cannot be mapped to the reserved resource, to avoid being punctured by the resource of the HARQ-ACK.

In a possible manner, mapping of the reserved resource may still be performed by using the foregoing manner of mapping at equal distances on an available resource, and mapping, on the reserved resource, of a resource that actually needs to be transmitted may still also be performed by using the foregoing manner of mapping at equal distances on the reserved resource.

Figure 6:
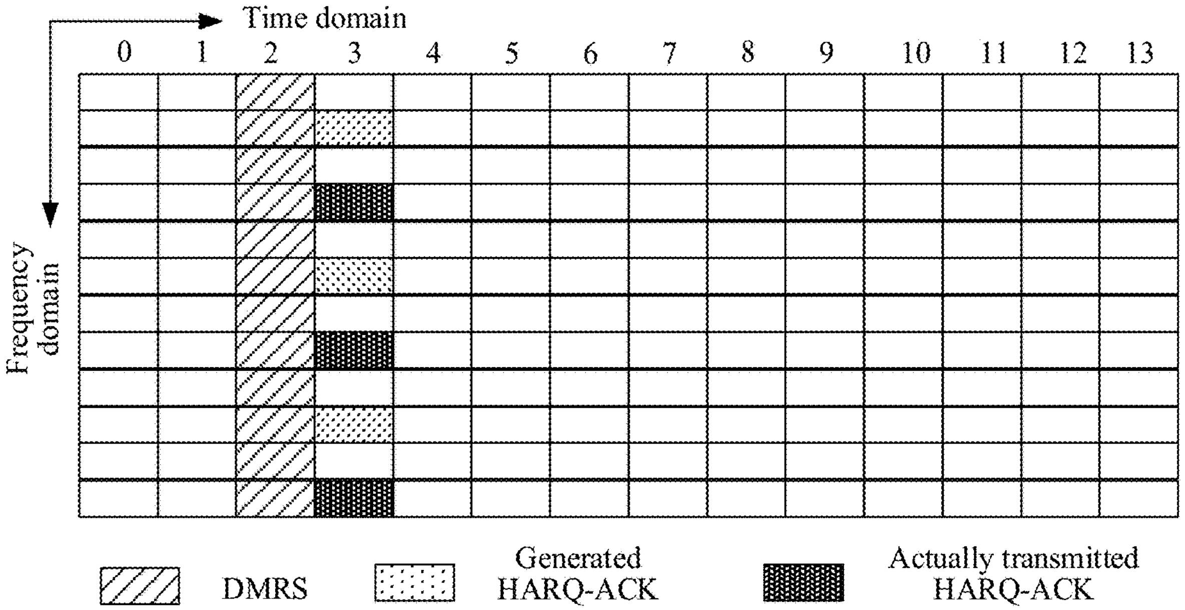
FIG. 6 is a schematic diagram of yet another example of resource mapping according to an embodiment of this application.

For example, as shown in FIG. 6, three HARQ-ACK REs are actually transmitted, and the three REs are distributed at equal distances on the reserved HARQ-ACK resources.

If the network device cannot learn of, in advance, a size of resources required by the terminal device for feedback, the network device cannot configure corresponding resources for a physical uplink channel, and when the resources required for feedback is relatively large, it is possible that the terminal device has insufficient feedback resources.

In addition, when the physical uplink resource configured by the network device is sufficient, the terminal device may further send the uplink data while sending the UCI. For example, CSI and uplink data are sent on a PUSCH.

However, the network device cannot learn in advance whether the terminal device sends the UCI or the uplink data on the physical uplink channel, and therefore cannot correctly receive the UCI or the uplink data. Consequently, transmission reliability is reduced.

The UCI mainly includes three parts: an HARQ-ACK, a CSI part 1, and a CSI part 2, and an amount of data of the CSI part 2 has significantly increased. An amount of data of the CSI part 2 depends on the CSI part 1. When scheduling a resource, the base station does not know the amount of data of the CSI part 2. Consequently, the scheduled resource may be insufficient. In this case, the CSI part 2 cannot be effectively carried on an allocated resource. In this case, a part or all of the amount of data of the CSI part 2 needs to be discarded, and a specific amount of data to be discarded needs to be calculated.

It provides a rule of discarding the CSI part 2 on a resource to which data is allocated. A code rate calculation method is first described. Generally, a code rate is used to represent a ratio of a quantity of bits before data encoding to a quantity of bits that are actually transmitted. For example, in the following formula, a numerator may be a size of a TB block on which CRC attachment is performed, and a denominator is a product of a quantity of REs that are actually allocated and a modulation order. The base station indicates a code rate and a modulation order that correspond to the terminal device, so that the terminal device can deduce a size of a TB block.

$$\text{Code rate} = (TB + CRC)/(\text{quantity of } REs \times \text{modulation order})$$

It should be understood that the foregoing enumerated parameters, for example, a modulation order, a quantity of bits of a CRC code, a smallest code rate, a quantity of subcarriers included in one RB, and a quantity of symbols included in one RB, may be predefined, or may be configured by the network device by using signaling. This is not limited in this application.

$C_{MCS}$ is a code rate of data, and the code rate is indicated by using DCI. In the DCI, 5 bits are used to indicate a modulation and coding scheme (MCS) of the scheduled uplink data. Specifically, the DCI is used to indicate a modulation and coding scheme used by a corresponding PDSCH, and therefore, the terminal device may calculate a size of a corresponding transport block according to the scheduled resource and an MCS index indicated by the PDCCH and according to a predefined rule.

Specifically, a protocol defines the following Table 1.

In Table 1, corresponding to 32 possible MCS indices in a first column, a second column provides modulation orders. 1 corresponds to a binary phase shift keying (BPSK) modulation scheme, 2 corresponds to a quadrature phase shift keying (QPSK) modulation scheme, 4 corresponds to a 16 quadrature amplitude (16QAM) modulation scheme, and 6 corresponds to a 64 quadrature amplitude (64QAM) modulation scheme. A third column provides corresponding code rates, namely, $C_{MCS}$. In this table, rows 28, 29, 30, and 31 are used to indicate that data currently sent by the terminal device is retransmitted data. A main function of the table is to enable the terminal device to determine a size of a transport block by using an indicated MCS and code rate. Because a size of a transport block of retransmitted data is the same as that of initially transmitted data, a corresponding code rate is not defined in the table.

TABLE 1

| MCS Index $I_{MCS}$ | Modulation Order $Q_m$ | Target code Rate × 1024 R | Spectral efficiency |
|---|---|---|---|
| 0 | 1 | 240 | 0.2344 |
| 1 | 1 | 314 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 779 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | 1 | reserved | |
| 29 | 2 | reserved | |
| 30 | 4 | reserved | |
| 31 | 6 | reserved | |

Similarly, for the CSI part 2, a corresponding code rate also exists. A numerator of a code rate is a quantity of bits of the CSI part 2, and a denominator is a product of a quantity of actually allocated REs and a modulation order.

$$\beta_{offset}^{CSI-2}$$

is a ratio of the code rate of data to the code rate of the CSI part 2. The ratio may be indicated in DCI, or may be semi-statically configured. A specific reference table is shown in Table 2. Higher layer signaling may be used to configure four values in the table for the terminal device, and then the DCI is used to indicate which one of the four values is specifically used.

TABLE 2

| $I_{offset,0}^{CSI-1}$ or $I_{offset,1}^{CSI-1}$ or $I_{offset,0}^{CSI-2}$ or $I_{offset,1}^{CSI-2}$ | $\beta_{offset}^{CSI-1}$ $\beta_{offset}^{CSI-2}$ |
|---|---|
| 0 | 1.125 |
| 1 | 1.250 |
| 2 | 1.375 |
| 3 | 1.625 |
| 4 | 1.750 |
| 5 | 2.000 |
| 6 | 2.250 |
| 7 | 2.500 |
| 8 | 2.875 |
| 9 | 3.125 |
| 10 | 3.500 |
| 11 | 4.000 |
| 12 | 5.000 |
| 13 | 6.250 |
| 14 | 8.000 |
| 15 | 10.000 |
| 16 | 15.875 |
| 17 | 20.000 |
| 18 | Reserved |
| 19 | Reserved |
| 20 | Reserved |
| 21 | Reserved |
| 22 | Reserved |
| 23 | Reserved |
| 24 | Reserved |
| 25 | Reserved |
| 26 | Reserved |
| 27 | Reserved |
| 28 | Reserved |
| 29 | Reserved |
| 30 | Reserved |
| 31 | Reserved |

A code rate threshold Cr corresponding to the CSI part 2 may be determined by using indicated $C_{MCS}$ and $$\beta_{offset}^{CSI-2},$$

and then a discarding degree of the CSI part 2 is determined by using the threshold Cr. Specific discarding priorities are defined by a protocol, as shown in Table 3 below. When the terminal device finds that a code rate is not lower than the code rate threshold, discarding is performed sequentially in ascending order of priorities until the code rate decreases to below the threshold.

TABLE 3

| |
|---|
| Priority 0: |
| Part 2 wideband CSI for CSI reports 1 to $N_{Rep}$ |
| Priority 1: |
| Part 2 subband CSI of even subbands for CSI report 1 |
| Priority 2: |
| Part 2 subband CSI of odd subbands for CSI report 1 |
| Priority 3: |
| Part 2 subband CSI of even subbands for CSI report 2 |
| Priority 4: |
| Part 2 subband CSI of odd subbands for CSI report 2 |
| . |
| . |
| . |
| Priority $2N_{Rep}-1$: |
| Part 2 subband CSI of even subbands for CSI report $N_{Rep}$ |
| Priority $2N_{Rep}$: |
| Part 2 subband CSI of odd subbands for CSI report $N_{Rep}$ |

Specifically, it is assumed that the CSI part 2 currently generated by the terminal device is A bits, and the A bits are bits on which CRC check has been performed. A quantity of available resource REs of the CSI part 2 is B, and a quantity of available resources is calculated by the base station and the terminal device in a predefined manner. If the terminal device finds that a value of A÷B exceeds the code rate threshold $C_T$, the terminal device discards content of the A bits according to priorities until the value of the A÷B does not exceed the code rate threshold $C_T$.

For the quantity of available resources of the CSI part 2, specific calculation formulas are, for example, formulas (1) to (3):

$$Q'_{ACK}=\min\left\{\left\lceil\frac{(O_{ACK}+L_{ACK})\cdot\beta_{offset}^{HARQ\text{-}ACK}\cdot\sum_{l=0}^{N_{symb,all}^{PUSCH}-1}M_{sc}^{\Phi^{UCI}}(l)}{\sum_{r=0}^{C_{UL\text{-}SCH}-1}K_r}\right\rceil,\ \alpha*\sum_{l=l_0}^{N_{symb,all}^{PUSCH}-1}M_{sc}^{\Phi^{UCI}}(l)\right\}\tag{1}$$

$$Q'_{CSI\text{-}1}=\min\left\{\left\lceil\frac{(O_{CSI\text{-}1}+L_{CSI\text{-}1})\cdot\beta_{offset}^{CSI\text{-}1}\cdot\sum_{l=0}^{N_{symb,all}^{PUSCH}-1}M_{sc}^{\Phi^{UCI}}(l)}{\sum_{r=0}^{C_{UL\text{-}SCH}-1}K_r}\right\rceil,\ \left(\alpha*\sum_{l=0}^{N_{symb,all}^{PUSCH}-1}M_{sc}^{\Phi^{UCI}}(l)\right)-Q'_{HARQ\text{-}ACK}\right\}\tag{2}$$

-continued $$Q'_{CSI-2} = \min\left\{\left\lceil \frac{(O_{CSI-2} + L_{CSI-2}) \cdot \beta_{offset}^{CSI-2} \cdot \sum_{l=0}^{N_{symb,all}^{PUSCH}-1} M_{sc}^{\Phi^{UCI}}(l)}{\sum_{r=0}^{C_{UL-SCH}-1} K_r} \right\rceil, \left\lceil \alpha * \sum_{l=0}^{N_{symb,all}^{PUSCH}-1} M_{sc}^{\Phi^{UCI}}(l) \right\rceil - Q'_{HARQ-ACK} - Q'_{CSI-1} \right\} \quad (3)$$

The formula (1) indicates a resource of an HARQ-ACK transmitted on a PUSCH. In the formula (1), $O_{ACK}$ represents a quantity of HARQ-ACK bits, $L_{ACK}$ represents a quantity of CRC bits corresponding to the HARQ-ACK, and $$\beta_{offset}^{HARQ-ACK}$$

represents an offset of a code rate for the HARQ-ACK $$\sum_{l=0}^{N_{symb,all}^{PUSCH}-1} M_{sc}^{\Phi^{UCI}}(l)$$

represents a quantity of REs that can be used for data of UCI transmission, and $$\sum_{r=0}^{C_{UL-SCH}-1} K_r$$

represents a quantity of bits that is obtained after data code blocks are cascaded. α represents a value less than or equal to 1, and α={0.5, 0.65, 0.8, 1}, and is a parameter configured by using higher layer signaling. $l_0$ represents a first available non-DMRS symbol following the DMRS.

The formula (2) represents a resource of the CSI part 1 transmitted on the PUSCH. In the formula (2), $O_{CSI-1}$ represents a quantity of bits for the CSI part 1, $L_{CSI-1}$ represents a quantity of CRC check bits corresponding to the CSI part 1, and $$\beta_{offset}^{CSI-1}$$

represents an offset of the code rate for the CSI part 1.

$$\sum_{l=0}^{N_{symb,all}^{PUSCH}-1} M_{sc}^{\Phi^{UCI}}(l)$$

represents a quantity of REs that can be used for data of UCI transmission, and $$\sum_{r=0}^{C_{UL-SCH}-1} K_r$$

represents a quantity of bits that is obtained after data code blocks are cascaded. α represents a value less than or equal to 1, and α={0.5, 0.65, 0.8, 1}, and is a parameter configured by using higher layer signaling. A right side of a min function of the formula indicates that an upper boundary of a resource occupied by the CSI part 1 is not greater than a value obtained by subtracting a quantity of REs occupied by the HARQ-ACK from a quantity of all available REs for data.

The formula (3) represents a resource of the CSI part 2 transmitted on the PUSCH. In the formula (3), $O_{CSI-2}$ represents a quantity of bits for the CSI part 2, $L_{CSI-2}$ represents a quantity of CRC check bits corresponding to the CSI part 2, and $$\beta_{offset}^{CSI-2}$$

offset represents an offset of the code rate for the CSI part 2.

$$\sum_{l=0}^{N_{symb,all}^{PUSCH}-1} M_{sc}^{\Phi^{UCI}}(l)$$

represents a quantity of REs that can be used for data of UCI transmission, and $$\sum_{r=0}^{C_{UL-SCH}-1} K_r$$

represents a quantity of bits that is obtained after data code blocks are cascaded. α represents a value less than or equal to 1, and α={0.5, 0.65, 0.8, 1}, and is a parameter configured by using higher layer signaling. A right side of a min function of the formula indicates that an upper boundary of a resource occupied by the CSI part 2 is not greater than a value obtained by subtracting a quantity of REs occupied by the HARQ-ACK and the CSI part 1 from a quantity of all available REs for data.

In the foregoing solution, data scheduling and transmission are required. When there is no uplink data, because there is no data code rate, the code rate threshold cannot be calculated by using this method, and therefore, an amount of data of the CSI part 2 that needs to be discarded cannot be determined.

According to the communication method provided in this embodiment of this application, when only UCI is to be transmitted on a physical uplink channel, in other words, when only UCI is transmitted on a resource allocated by a network device, a code rate threshold can be determined, so that a discarding rule of the UCI is determined.

It should be particularly noted that in this embodiment of this application, "a case in which the terminal device sends only UCI on a physical uplink channel" is mentioned a plurality of times. This description is relative to uplink data.

To be specific, in the uplink data and the UCI, the terminal device sends only the UCI but does not send the uplink data. Therefore, "the terminal device sends only UCI on a physical uplink channel" does not indicate that the terminal device does not send another signal, for example, a demodulation reference signal (DMRS), on the physical uplink channel. In some cases, if the terminal device sends only UCI but does not send a demodulation reference signal on the physical uplink channel, the network device cannot correctly receive the UCI. In addition, when the terminal device sends only UCI on a physical uplink channel, a possibility of sending a reference signal, for example, a sounding reference signal (SRS), other than the DMRS by the terminal device on the physical uplink channel is not excluded in this application.

Figure 7:
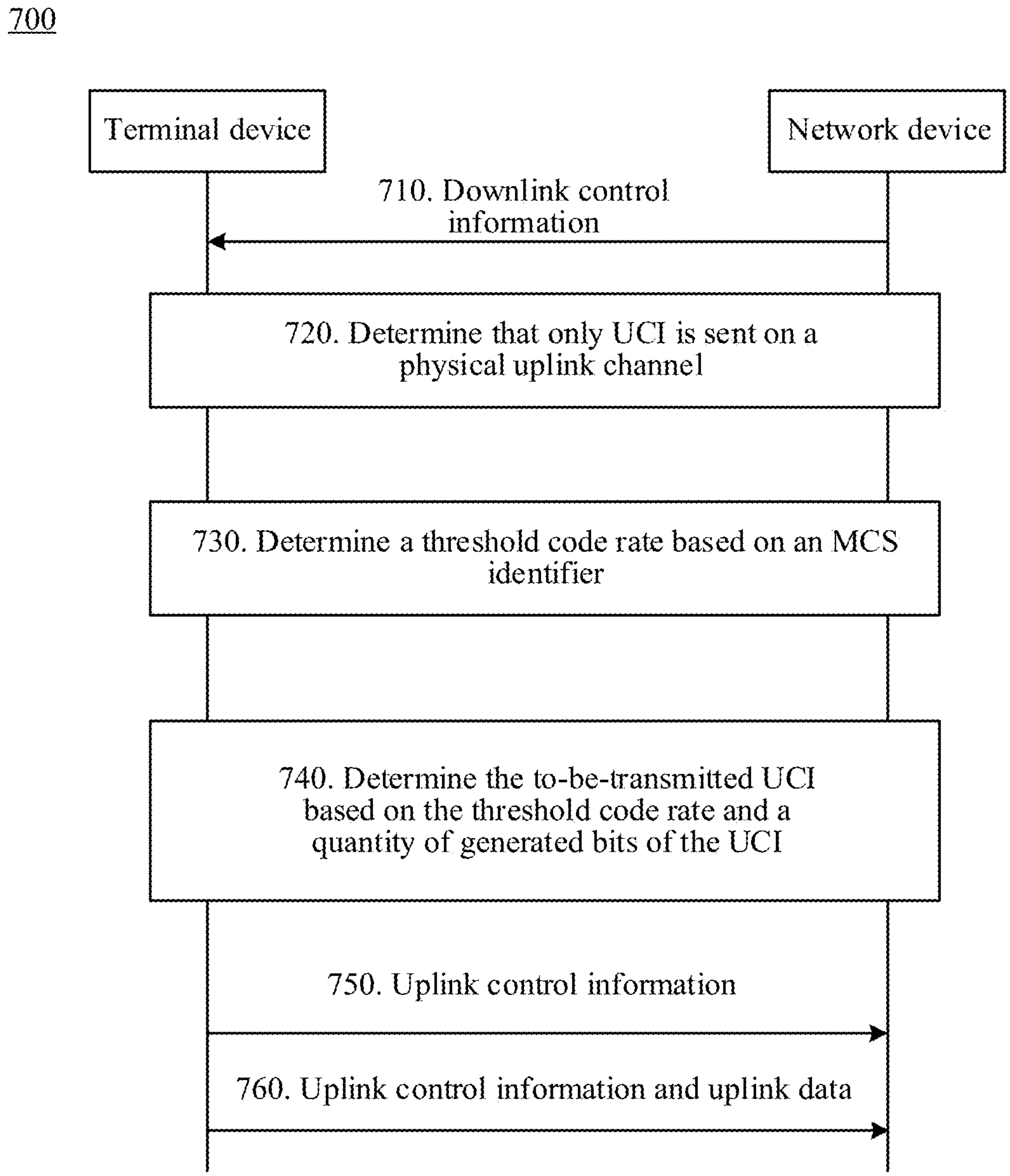
FIG. 7 is a flowchart of a communication method according to an embodiment of this application.

FIG. 7 is a flowchart of a communication method 700 according to an embodiment of this application from a perspective of device interaction. As shown in the figure, the method 700 shown in FIG. 7 may include steps 710 to 760. The following describes the method 700 in detail with reference to FIG. 7.

Step 710: A network device sends downlink control information DCI, and correspondingly, a terminal device receives the DCI sent by the network device, and obtains information in the DCI.

Optionally, the DCI may include first indication information, used to determine a first code rate.

Optionally, the DCI may further include second indication information, used to indicate whether only the UCI is to be transmitted on a physical uplink channel. The terminal device may determine, according to the second indication information, whether only the UCI is to be transmitted on the physical uplink channel. For example, the second indication information may be an information indication field carried in the DCI, and the indication field is used to determine whether only the UCI is to be transmitted on the physical uplink channel.

Optionally, the DCI may further include a modulation and coding scheme (MCS) field, and the MCS field includes an MCS index.

Specifically, the first indication information and/or the second indication information may be information carried in higher layer signaling, for example, an RRC message or a MAC CE. Alternatively, the first indication information and/or the second indication information may be information, for example, DCI, carried in physical layer signaling.

Optionally, the second indication information may indicate, by using a newly added field in the higher layer signaling or the physical layer signaling, whether only the UCI is to be transmitted on the physical uplink channel. The newly added field may be, for example, a UCI only field or a UE content field.

For example, when the UCI only field indicates UCI-only=TRUE, it may indicate that only UCI is to be transmitted on the physical uplink channel. When the UCI only field indicates UCI-only=FALSE, it may indicate that UCI and uplink data are to be transmitted on the physical uplink channel.

Alternatively, when the UE content field is set to "0", it may indicate that only UCI is to be transmitted on the physical uplink channel. When the UE content field is set to "1", it may indicate that UCI and uplink data are to be transmitted on the physical uplink channel. Alternatively, when the UE content field is set to "00", it may indicate that only UCI is to be transmitted on the physical uplink channel. When the UE content field is set to "01", it may indicate that UCI and uplink data are to be transmitted on the physical uplink channel. When the UE content field is set to "10", it may indicate that uplink data is to be transmitted on the physical uplink channel. The UE content field is in a reserved state when set to "11".

It should be understood that the signaling that carries the first indication information, the field that carries the first indication information, and the specific manner of indicating, by using the foregoing enumerated field, whether only UCI is to be transmitted on the physical uplink channel that are enumerated above are merely examples for description, and should not constitute any limitation on this application. For example, the first indication information may alternatively be indicated by using another existing field. This is not limited in this application.

Step 720: The terminal device determines that only the UCI is to be transmitted on a physical uplink channel. Correspondingly, the network device determines that only the UCI is to be transmitted on the physical uplink channel.

Specifically, a resource scheduled by the network device by using information of the DCI may be used to transmit data and/or the UCI, and the network device needs to make the terminal device learn whether uplink data needs to be transmitted. If only the UCI is transmitted but the uplink data does not need to be transmitted, the terminal device does not generate a TB block, but all resources are allocated to the UCI. If both the uplink data and the UCI are transmitted, the terminal device needs to allocate resources to both the uplink data and the UCI.

The network device and the terminal device need to have consistent understanding of the two cases. If the network device informs the terminal device that the uplink data and the UCI are transmitted on a corresponding resource, the terminal device allocates resources to the data and the UCI according to the resources allocated by the network device and an agreed manner.

Optionally, the terminal device may determine, according to the indication information carried in the DCI, whether only the UCI is to be transmitted on the physical uplink channel. In an embodiment, for example, it is determined, according to the second indication information, whether only the UCI is to be transmitted on the physical uplink channel. Alternatively, it is determined, according to an MCS index, a redundancy version (RV) indicator, and a new data indicator (NDI), whether only the UCI is to be transmitted on the physical uplink channel.

In an embodiment, for example, in the DCI, 1 bit may be used to indicate a case in which only the UCI is to be transmitted on the physical uplink channel.

Optionally, it is determined, according to the MCS index, whether only the UCI is to be transmitted on the physical uplink channel. When the MCS index falls within a preset range (for example, a second range), it is determined that only the UCI is to be transmitted on the physical uplink channel. Otherwise, it is determined that the UCI and the uplink data are to be transmitted on the physical uplink channel. It should be understood that an MCS corresponding to an index within the preset range is used to indicate retransmission, or the preset range is defined in a protocol.

In this embodiment of this application, a range of rows in which a value of MCS index (Ives) in Table 1 is from 0 to 27 (including 0 and 27) is a first range, and a range of rows in which a value of MCS index (Ives) in Table 1 is 28, 29, 30, or 31 is a second range. It should be understood that this application is not limited thereto.

As an embodiment instead of a limitation, for example, when the MCS index included in the DCI is greater than or equal to 28, it indicates a case in which only the UCI is to be transmitted on the physical uplink channel. That is, for the rows in which a value of MCS index ($I_{MCS}$) in Table 1 is 28, 29, 30, or 31, new meanings may be added to rows 28, 29, 30, and 31. In addition to being used to indicate that data currently sent by the user equipment is retransmitted data, the value of MCS index ($I_{MCS}$) of rows may be further used to indicate a case in which only the UCI is to be transmitted on the physical uplink channel.

Optionally, a case in which only the UCI is to be transmitted on the physical uplink channel may be indicated according to the MCS index, the RV indicator, and the NDI. For example, a range indicated by the MCS index is from 28 to 31, an RV value is 0, and a value of the NDI is different from a value of previous transmission. In other words, the NDI is inverted. The three fields may be used to notify the UE that no data is transmitted on a PUSCH channel corresponding to the terminal device, and only the UCI is transmitted.

Step 730: The terminal device determines a threshold code rate according to an MCS index, and correspondingly, the network device determines the threshold code rate according to the MCS index.

Optionally, if the MCS index falls within a first range, a first code rate is determined according to a predefined one-to-one correspondence between the MCS index and the first code rate. The first code rate is determined as the threshold code rate, or the threshold code rate is determined according to the first code rate and an offset β, where the offset β is greater than or equal to 1.

Specifically, when a value of the MCS index ranges from 0 to 27 (including 0 and 27), a correspondence between the MCS index and the first code rate may be defined by using a protocol. The MCS index and the first code rate are in a one-to-one correspondence, which is, for example, presented as a case shown in Table 1. When an MCS Index value is 8, a corresponding first code rate is 602. The terminal device reads a code rate 602 corresponding to 8, and uses the code rate as a first code rate for calculating a code rate threshold, or determines the threshold code rate according to the first code rate and the offset β, where the offset β is greater than or equal to 1. It should be understood that this embodiment of this application is not limited thereto.

Optionally, when the MCS index falls within a second range, a modulation order is determined according to the MCS index, and the first code rate is determined according to a correspondence between the modulation order and the first code rate, and the first code rate is determined as the threshold code rate; or the threshold code rate is determined according to the first code rate and the offset β, where the offset β is greater than or equal to 1.

Specifically, when the value of the MCS index ranges from 28 to 31 (including 28 and 31), the first code rate may be determined by defining a correspondence between the MCS index and the modulation order and according to the correspondence between the modulation order and the first code rate.

It should be noted herein that the modulation order has four values: 1, 2, 4, and 6, and each value corresponds to a plurality of code rates. Optionally, if the modulation order corresponds to a plurality of first code rates, a largest code rate in the plurality of first code rates is determined as the first code rate.

Optionally, if the modulation order corresponds to a plurality of first code rates, a smallest code rate in the plurality of first code rates is determined as the first code rate.

Optionally, if the modulation order corresponds to a plurality of first code rates, the first code rate is determined according to first indication information.

In another possible implementation, when the MCS index falls within a second range, the first code rate is determined according to a predefined one-to-one correspondence between the MCS index and the first code rate, and the first code rate is determined as the threshold code rate; or the threshold code rate is determined according to the first code rate and the offset β, where the offset β is greater than or equal to 1.

Specifically, when the value of the MCS index ranges from 28 to 31 (including 28 and 31), a one-to-one correspondence between the MCS index and the first code rate may be defined by using a protocol. For example, when the MCS Index value is 29, a corresponding first code rate is 602, and 602 is determined as the first code rate, or the threshold code rate is determined according to the first code rate and the offset β, where the offset β is greater than or equal to 1.

Step 740: The terminal device determines a quantity of bits of to-be-transmitted UCI according to the threshold code rate and a quantity of generated bits of the UCI, where the quantity of bits of the to-be-transmitted UCI is less than or equal to the quantity of generated bits of the UCI. Correspondingly, the network device determines a quantity of bits of to-be-received UCI according to the threshold code rate and the quantity of generated bits of the UCI.

Optionally, in a possible implementation, a quantity of available resources of transmitted UCI is obtained by using the foregoing formulas (1) to (3).

In another possible implementation, the following formulas (4) to (6) are used:

$$Q'_{ACK} = \min\left\{\left\lceil \frac{(O_{ACK} + L_{ACK}) \cdot \beta_{offset}^{HARQ\text{-}ACK} \cdot \sum_{l=0}^{N_{symb,all}^{PUSCH}-1} M_{sc}^{\Phi^{UCI}}(l)}{\sum_{r=0}^{C_{UL\text{-}SCH}-1} K_r} \right\rceil, \alpha_0 * \sum_{l=l_0}^{N_{symb,all}^{PUSCH}-1} M_{sc}^{\Phi^{UCI}}(l)\right\} \quad (4)$$

$$Q'_{CSI\text{-}1} = \min\left\{\left\lceil \frac{(O_{CSI\text{-}1} + L_{CSI\text{-}1}) \cdot \beta_{offset}^{CSI-1} \cdot \sum_{l=0}^{N_{symb,all}^{PUSCH}-1} M_{sc}^{\Phi^{UCI}}(l)}{\sum_{r=0}^{C_{UL\text{-}SCH}-1} K_r} \right\rceil, \left(\alpha_1 * \sum_{l=0}^{N_{symb,all}^{PUSCH}-1} M_{sc}^{\Phi^{UCI}}(l)\right) - Q'_{HARQ\text{-}ACK}\right\} \quad (5)$$

-continued $$Q'_{CSI\text{-}2}=\min\left\{\left\lceil\frac{(O_{CSI\text{-}2}+L_{CSI\text{-}2})\cdot\beta_{offset}^{CSI-2}\cdot\sum_{l=0}^{N_{symb,all}^{PUSCH}-1}M_{sc}^{\Phi^{UCI}}(l)}{\sum_{r=0}^{C_{UL\text{-}SCH}-1}K_r}\right\rceil,\left(\alpha_2*\sum_{l=0}^{N_{symb,all}^{PUSCH}-1}M_{sc}^{\Phi^{UCI}}(l)\right)-Q'_{HARQ\text{-}ACK}-Q'_{CSI\text{-}1}\right\}\qquad(6)$$

Different from formulas (1) to (3), values of corresponding a may be different for different UCI values. A benefit of such a design is that different values of a are set for different UCI, so that upper boundaries occupied by the different UCI are different, thereby preventing an amount of data of a type of UCI from exceeding data. A min operation of the formula always takes a right item. As a result, all resources are allocated to a type of UCI, and cannot be allocated to other UCI.

For example, according to the formula (1), if $$O_{ACK}+L_{ACK}>\sum_{r=0}^{C_{UL\text{-}SCH}-1}K_r,$$

because a beta parameter is an item greater than or equal to 1, the min operation takes a right item to a great extent. In this case, all resources of $$\alpha*\sum_{l=l_0}^{N_{symb,all}^{PUSCH}-1}M_{sc}^{\Phi^{UCI}}(l)$$

are allocated to the HARQ-ACK. When calculation is performed by using the formula (2) again, a right item in the formula (2) is 0. Therefore, no resource can be allocated to the CSI part 1, and no resource can be allocated to the CSI part 2.

However, if different values of a may be configured for each type of UCI, for example, a value of $\alpha_0$ is 0.5, a value of $\alpha_1$ is 0.6, and a value of $\alpha_2$ is 0.8, it is ensured that a resource can be allocated to each type of UCI.

In another possible implementation, formulas (7) to (9) are used. The formula (7) is the same as the formula (1).

$$Q'_{ACK}=\min\left\{\left\lceil\frac{(O_{ACK}+L_{ACK})\cdot\beta_{offset}^{HARQ\text{-}ACK}\cdot\sum_{l=0}^{N_{symb,all}^{PUSCH}-1}M_{sc}^{\Phi^{UCI}}(l)}{\sum_{r=0}^{C_{UL\text{-}SCH}-1}K_r}\right\rceil,\alpha*\sum_{l=l_0}^{N_{symb,all}^{PUSCH}-1}M_{sc}^{\Phi^{UCI}}(l)\right\}\qquad(7)$$

$$Q'_{CSI\text{-}1}=\min\left\{\left\lceil\frac{(O_{CSI\text{-}1}+L_{CSI\text{-}1})\cdot\beta_{offset}^{CSI\text{-}1}\cdot\sum_{l=0}^{N_{symb,all}^{PUSCH}-1}M_{sc}^{\Phi^{UCI}}(l)}{\sum_{r=0}^{C_{UL\text{-}SCH}-1}K_r}\right\rceil,\alpha*\left(\sum_{l=0}^{N_{symb,all}^{PUSCH}-1}M_{sc}^{\Phi^{UCI}}(l)-Q'_{HARQ\text{-}ACK}\right)\right\}\qquad(8)$$

$$Q'_{CSI\text{-}2}=\min\left\{\left\lceil\frac{(O_{CSI\text{-}2}+L_{CSI\text{-}2})\cdot\beta_{offset}^{CSI\text{-}2}\cdot\sum_{l=0}^{N_{symb,all}^{PUSCH}-1}M_{sc}^{\Phi^{UCI}}(l)}{\sum_{r=0}^{C_{UL\text{-}SCH}-1}K_r}\right\rceil,\alpha*\left(\sum_{l=0}^{N_{symb,all}^{PUSCH}-1}M_{sc}^{\Phi^{UCI}}(l)-Q'_{HARQ\text{-}ACK}-Q'_{CSI\text{-}1}\right)\right\}\qquad(9)$$

An advantage of this manner lies in that even if in the formula (7), all resources $$\alpha * \sum_{l=l_0}^{N_{symb,all}^{PUSCH}-1} M_{sc}^{\Phi^{UCI}}(l)$$

are allocated to the HARQ-ACK, in formula (8), after the resource of the HARQ-ACK is removed from the total resources, an a proportion of resources in the remaining resources are then allocated to the CSI-part 1, and in formula (9), after the resources of the HARQ-ACK and the CSI part 1 are removed from the total resources, then, an a proportion of resources in the remaining resources are allocated to the CSI-part 2. According to this operation, it is ensured that resources can be allocated to each type of UCI and data.

In another manner, formulas (10) to (12) are used. A combination of the foregoing two manners is considered as follows:

$$Q'_{ACK} = \min\left\{\left\lceil \frac{(O_{ACK} + L_{ACK}) \cdot \beta_{offset}^{HARQ\text{-}ACK} \cdot \sum_{l=0}^{N_{symb,all}^{PUSCH}-1} M_{sc}^{\Phi^{UCI}}(l)}{\sum_{r=0}^{C_{UL\text{-}SCH}-1} K_r} \right\rceil, \alpha_0 * \sum_{l=l_0}^{N_{symb,all}^{PUSCH}-1} M_{sc}^{\Phi^{UCI}}(l)\right\} \tag{10}$$

$$Q'_{CSI\text{-}1} = \min\left\{\left\lceil \frac{(O_{CSI\text{-}1} + L_{CSI\text{-}1}) \cdot \beta_{offset}^{CSI\text{-}1} \cdot \sum_{l=0}^{N_{symb,all}^{PUSCH}-1} M_{sc}^{\Phi^{UCI}}(l)}{\sum_{r=0}^{C_{UL\text{-}SCH}-1} K_r} \right\rceil, \alpha_1 * \left(\sum_{l=0}^{N_{symb,all}^{PUSCH}-1} M_{sc}^{\Phi^{UCI}}(l) - Q'_{HARQ\text{-}ACK}\right)\right\} \tag{11}$$

$$Q'_{CSI\text{-}2} = \min\left\{\left\lceil \frac{(O_{CSI\text{-}2} + L_{CSI\text{-}2}) \cdot \beta_{offset}^{CSI\text{-}2} \cdot \sum_{l=0}^{N_{symb,all}^{PUSCH}-1} M_{sc}^{\Phi^{UCI}}(l)}{\sum_{r=0}^{C_{UL\text{-}SCH}-1} K_r} \right\rceil, \alpha_2 * \left(\sum_{l=0}^{N_{symb,all}^{PUSCH}-1} M_{sc}^{\Phi^{UCI}}(l) - Q'_{HARQ\text{-}ACK} - Q'_{CSI\text{-}1}\right)\right\} \tag{12}$$

If the base station informs the terminal device that only the UCI is transmitted on the corresponding resource, the terminal device allocates a resource to the UCI according to the allocated resource and an agreed manner.

In a possible implementation for the HARQ-ACK, formulas (13) and (13a-d, f-h) are used.

$$Q'_{ACK}=\min\left\{\left\lceil\frac{(O_{ACK}+L_{ACK})\cdot\beta_{offset}^{PUSCH}\cdot\sum_{l=0}^{N_{symb,all}^{PUSCH}-1}M_{sc}^{UCI}(l)}{O_{CSI\text{-}1}+L_{CSI\text{-}1}}\right\rceil,\ \sum_{l_0=0}^{N_{symb,all}^{PUSCH}-1}M_{sc}^{UCI}(l)\right\}\tag{13}$$

$O_{CSI\text{-}1}+L_{CSI\text{-}1}$ represents a quantity of CSI part 1 bits that is obtained after CRC check is performed, and $$\beta_{offset}^{PUSCH}=\beta_{offset}^{HARQ\text{-}ACK}/\beta_{offset}^{CSI\text{-}part1}.$$

α is introduced in another possible formula. α is a number less than or equal to 1, and different values may be used for different UCI, as follows:

$$Q'_{ACK}=\min\left\{\left\lceil\frac{(O_{ACK}+L_{ACK})\cdot\beta_{offset}^{PUSCH}\cdot\sum_{l=0}^{N_{symb,all}^{PUSCH}-1}M_{sc}^{UCI}(l)}{O_{CSI\text{-}1}+L_{CSI\text{-}1}}\right\rceil,\ \alpha\sum_{l_0=0}^{N_{symb,all}^{PUSCH}-1}M_{sc}^{UCI}(l)\right\}\tag{13-a}$$

In this manner, it is prevented that all available resources are allocated to the HARQ-ACK.

In another possible manner, formula (13-b) is used:

$$Q'_{ACK}=\min\left\{\left\lceil\frac{(O_{ACK}+L_{ACK})\cdot\beta_{offset}^{PUSCH}\cdot\sum_{l=0}^{N_{symb,all}^{PUSCH}-1}M_{sc}^{UCI}(l)}{O_{CSI\text{-}2}+L_{CSI\text{-}2}}\right\rceil,\ \sum_{l_0=0}^{N_{symb,all}^{PUSCH}-1}M_{sc}^{UCI}(l)\right\}\tag{13-b}$$

$O_{CSI\text{-}2}+L_{CSI\text{-}2}$ represents a quantity of CSI part 2 bits that is obtained after CRC check is performed.

α is introduced in another possible formula. α is a number less than or equal to 1, and different values may be used for different UCI, as the following formula (13-c):

$$Q'_{ACK}=\min\left\{\left\lceil\frac{(O_{ACK}+L_{ACK})\cdot\beta_{offset}^{PUSCH}\cdot\sum_{l=0}^{N_{symb,all}^{PUSCH}-1}M_{sc}^{UCI}(l)}{O_{CSI\text{-}2}+L_{CSI\text{-}2}}\right\rceil,\ \alpha\sum_{l_0=0}^{N_{symb,all}^{PUSCH}-1}M_{sc}^{UCI}(l)\right\}\tag{13-c}$$

In another possible manner, formula (13-d) is used:

$$Q'_{ACK}=\min\left\{\left\lceil\frac{(O_{ACK}+L_{ACK})\cdot\beta_{offset}^{PUSCH}\cdot\sum_{l=0}^{N_{symb,all}^{PUSCH}-1}M_{sc}^{UCI}(l)}{O_{CSI\text{-}1}+L_{CSI\text{-}1}+O_{CSI\text{-}2}+L_{CSI\text{-}2}}\right\rceil,\ \sum_{l_0=0}^{N_{symb,all}^{PUSCH}-1}M_{sc}^{UCI}(l)\right\}\tag{13-d}$$

α is introduced in another possible formula. α is a number less than or equal to 1, and different values may be used for different UCI, as the following formula (13-f):

$$Q'_{ACK}=\min\left\{\left\lceil\frac{(O_{ACK}+L_{ACK})\cdot\beta_{offset}^{PUSCH}\cdot\sum_{l=0}^{N_{symb,all}^{PUSCH}-1}M_{sc}^{UCI}(l)}{O_{CSI\text{-}1}+L_{CSI\text{-}1}+O_{CSI\text{-}2}+L_{CSI\text{-}2}}\right\rceil,\ \alpha\sum_{l_0=0}^{N_{symb,all}^{PUSCH}-1}M_{sc}^{UCI}(l)\right\}\tag{13-f}$$

A reference code rate is introduced in a possible manner.

$$\beta_{offset}^{PUSCH}=\beta_{offset}^{HARQ\text{-}ACK}\ \text{or}\ \beta_{offset}^{PUSCH}=\beta_{offset}^{HARQ\text{-}ACK}/\beta_{offset}^{CSI\text{-}part1}\ \text{or}\ \beta_{offset}^{PUSCH}=\beta_{offset}^{HARQ\text{-}ACK}/\beta_{offset}^{CSI\text{-}part2}:$$

$$Q'_{ACK}=\min\left\{\left\lceil\frac{(O_{ACK}+L_{ACK})\cdot\beta_{offset}^{PUSCH}}{c_{ref}}\right\rceil,\ \sum_{l_0=0}^{N_{symb,all}^{PUSCH}-1}M_{sc}^{UCI}(l)\right\}\tag{13-g}$$

$$Q'_{ACK}=\min\left\{\left\lceil\frac{(O_{ACK}+L_{ACK})\cdot\beta_{offset}^{PUSCH}}{c_{ref}}\right\rceil,\ \alpha\sum_{l_0=0}^{N_{symb,all}^{PUSCH}-1}M_{sc}^{UCI}(l)\right\}\tag{13-h}$$

For the CSI part 1, possible formulas are as follows: formulas (14) and (14 a-h). α is a number less than or equal to 1, and different values of $$\beta_{offset}^{PUSCH}=\beta_{offset}^{CSI-1}/\beta_{offset}^{CSI-2}$$

may be used for different UCI:

$$Q'_{CSI\text{-}1}=\min\left\{\left\lceil\frac{(O_{CSI\text{-}1}+L_{CSI\text{-}1})\cdot\beta_{offset}^{PUSCH}\cdot\sum_{l=0}^{N_{symb,all}^{PUSCH}-1}M_{sc}^{\Phi UCI}(l)}{O_{CSI\text{-}2}+L_{CSI\text{-}2}}\right\rceil,\ \sum_{l=0}^{N_{symb,all}^{PUSCH}-1}M_{sc}^{\Phi UCI}(l)-Q'_{HARQ\text{-}ACK}\right\}\tag{14}$$

$$Q'_{CSI\text{-}1}=\min\left\{\left\lceil\frac{(O_{CSI\text{-}1}+L_{CSI\text{-}1})\cdot\beta_{offset}^{PUSCH}\cdot\sum_{l=0}^{N_{symb,all}^{PUSCH}-1}M_{sc}^{UCI}(l)}{O_{CSI\text{-}2}+L_{CSI\text{-}2}}\right\rceil,\ \alpha\sum_{l=0}^{N_{symb,all}^{PUSCH}-1}M_{sc}^{\Phi UCI}(l)-Q'_{HARQ\text{-}ACK}\right\}\tag{14-a}$$

$$Q'_{CSI\text{-}1}=\min\left\{\left\lceil\frac{(O_{ACK}+L_{ACK})\cdot\beta_{offset}^{PUSCH}\cdot\sum_{l=0}^{N_{symb,all}^{PUSCH}-1}M_{sc}^{UCI}(l)}{O_{CSI\text{-}2}+L_{CSI\text{-}2}}\right\rceil,\ \alpha\left(\sum_{l=0}^{N_{symb,all}^{PUSCH}-1}M_{sc}^{\Phi UCI}(l)-Q'_{HARQ\text{-}ACK}\right)\right\}\tag{14-b}$$

Denominators are changed:

$$Q'_{CSI\text{-}1}=\min\left\{\left\lceil\frac{(O_{CSI\text{-}1}+L_{CSI\text{-}1})\cdot\beta_{offset}^{PUSCH}\cdot\sum_{l=0}^{N_{symb,all}^{PUSCH}-1}M_{sc}^{\Phi UCI}(l)}{O_{CSI\text{-}1}+L_{CSI\text{-}1}+O_{CSI\text{-}2}+L_{CSI\text{-}2}}\right\rceil,\ \sum_{l=0}^{N_{symb,all}^{PUSCH}-1}M_{sc}^{\Phi UCI}(l)-Q'_{HARQ\text{-}ACK}\right\}\tag{14-c}$$

$$Q'_{CSI\text{-}1}=\min\left\{\left\lceil\frac{(O_{CSI\text{-}1}+L_{CSI\text{-}1})\cdot\beta_{offset}^{PUSCH}\cdot\sum_{l=0}^{N_{symb,all}^{PUSCH}-1}M_{sc}^{UCI}(l)}{O_{CSI\text{-}1}+L_{CSI\text{-}1}+O_{CSI\text{-}2}+L_{CSI\text{-}2}}\right\rceil,\ \alpha\sum_{l=0}^{N_{symb,all}^{PUSCH}-1}M_{sc}^{\Phi UCI}(l)-Q'_{HARQ\text{-}ACK}\right\}\tag{14-d}$$

$$Q'_{CSI\text{-}1}=\min\left\{\left\lceil\frac{(O_{CSI\text{-}1}+L_{CSI\text{-}1})\cdot\beta_{offset}^{PUSCH}\cdot\sum_{l=0}^{N_{symb,all}^{PUSCH}-1}M_{sc}^{UCI}(l)}{O_{CSI\text{-}1}+L_{CSI\text{-}1}+O_{CSI\text{-}2}+L_{CSI\text{-}2}}\right\rceil,\ \alpha\left(\sum_{l=0}^{N_{symb,all}^{PUSCH}-1}M_{sc}^{\Phi UCI}(l)-Q'_{HARQ\text{-}ACK}\right)\right\}\tag{14-e}$$

It may be further considered to use a formula in a case in which there is data, and an MCS field is used to indicate a reference code rate $C_{Ref}$, and $$\beta_{offset}^{PUSCH}=\beta_{offset}^{CSI-1}/\beta_{offset}^{CSI-2}\ \text{or}\ \beta_{offset}^{PUSCH}=\beta_{offset}^{CSI-1}.$$

α is a number less than or equal to 1, and different values may be used for different UCI, and calculation is performed according to the code rate:

$$Q'_{CSI\text{-}1}=\min\left\{\left\lceil\frac{(O_{CSI\text{-}1}+L_{CSI\text{-}1})\cdot\beta_{offset}^{PUSCH}}{c_{ref}}\right\rceil,\ \sum_{l=0}^{N_{symb,all}^{PUSCH}-1}M_{sc}^{\Phi UCI}(l)-Q'_{HARQ\text{-}ACK}\right\}\tag{14-f}$$

$$Q'_{CSI\text{-}1}=\min\left\{\left\lceil(O_{CSI\text{-}1}+L_{CSI\text{-}1})\cdot\beta_{offset}^{PUSCH}\cdot c_{ref}\right\rceil,\ \alpha\sum_{l=0}^{N_{symb,all}^{PUSCH}-1}M_{sc}^{\Phi UCI}(l)-Q'_{HARQ\text{-}ACK}\right\}\tag{14-g}$$

$$Q'_{CSI\text{-}1}=\min\left\{\left\lceil(O_{CSI\text{-}1}+L_{CSI\text{-}1})\cdot\beta_{offset}^{PUSCH}\cdot c_{ref}\right\rceil,\ \alpha\left(\sum_{l=0}^{N_{symb,all}^{PUSCH}-1}M_{sc}^{\Phi UCI}(l)-Q'_{HARQ\text{-}ACK}\right)\right\}\tag{14-h}$$

For the CSI part 2, the quantity of available resources is as follows:

$$Q'_{CSI\text{-}part2}=\sum_{l=0}^{N_{symb,all}^{PUSCH}-1}M_{sc}^{\Phi UCI}(l)-Q'_{CSI\text{-}part1}-Q'_{HARQ\text{-}ACK}\tag{15}$$

The CSI part 2 resource that is obtained by calculation according to the foregoing plurality of implementations may be used to determine a quantity of discarded bits according to the resource of the CSI part 2, a modulation order indicated by the MCS field, and a corresponding reference code rate (namely, the first code rate). It is assumed that A is a quantity of generated bits of the CSI part 2, and A0 is the quantity of discarded bits. Therefore, A and A0 meet the following condition, and the discarding is performed according to the specified priorities in Table 3.

$$\frac{A-A0}{Q'_{CSI\text{-}part2}*\text{Modulation order}}<=\frac{c_{ref}}{\beta_{offset}^{CSI-2}}\tag{16}$$

Step 750: The terminal device determines a quantity of bits of a part or all of UCI (for example, a part or all of the CSI part 2) that needs to be discarded, in other words, determines a quantity of bits of UCI to be transmitted or actually to be transmitted, where the quantity of bits of the UCI to be transmitted is less than or equal to the quantity of generated bits of the UCI. The calculated quantity of bits of the UCI to be actually transmitted is transmitted to the network device, and the network device receives the corresponding quantity of bits of the UCI.

Alternatively, step 760: When there is uplink data and UCI to be sent, calculation is performed according to formulas (1) to (3), and a quantity of bits of a part or all of UCI (for example, a part or all of the CSI part 2) that needs to be discarded is determined, so that a quantity of bits of UCI to be transmitted or actually to be transmitted is determined, the calculated quantity of bits of the UCI to be actually transmitted and uplink data are transmitted to the network device, and the network device receives the corresponding quantity of bits of the UCI and the corresponding uplink data.

According to the foregoing technical solutions, when only the UCI is to be transmitted on the physical uplink channel, the network device and the terminal device may separately determine the threshold code rate according to the modulation and coding scheme (MCS) index, to send or receive the quantity of bits of to-be-transmitted UCI according to the threshold code rate and the quantity of generated bits of the UCI. Therefore, the terminal device can properly allocate resources, to ensure effective sending of the UCI data, and the network device can correctly receive the UCI, to improve data transmission reliability. In addition, when the physical uplink channel has sufficient resources, the terminal device may further send the UCI and the uplink data concurrently on the physical uplink channel. This improves resource utilization, and has no impact on correct reception of the UCI. Overall, this helps improve transmission performance of a communications system.

It should be understood that the communication method provided in this embodiment of this application is described in detail above merely for ease of understanding by using interaction between the network device and the terminal device as an example, but this should not constitute any limitation on this application. For example, the network device that sends the downlink control information to the terminal device and the network device that receives the UCI may be a same network device or different network devices. This is not limited in this application.

It should be further understood that FIG. 7 shows only an example of steps performed by the terminal device and the network device for ease of understanding, but this does not indicate that the terminal device and the network device perform each step shown in the figure. For example, the terminal device may determine that either step 710 or step 760 is performed according to a relationship between an allocated resource of the physical uplink channel and a code rate threshold.

It should be noted that the foregoing embodiment illustrates a calculation process. However, this illustrates only a possible implementation of calculating the threshold, and should not constitute any limitation on this application. A threshold calculation method is not particularly limited in this embodiment of this application.

Figure 8:
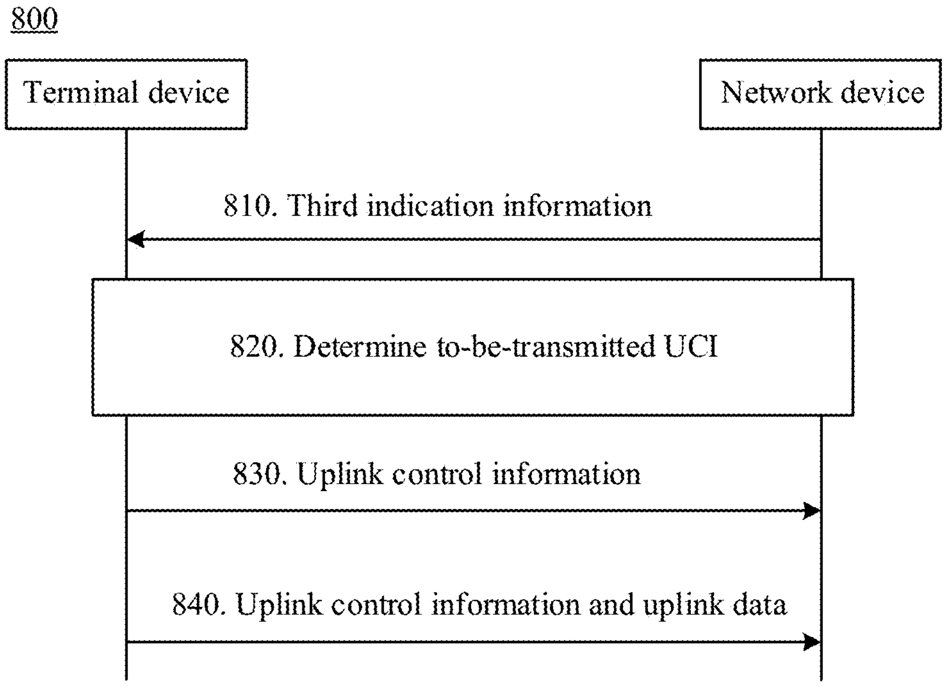
FIG. 8 is a flowchart of another communication method according to an embodiment of this application.

This application further provides a method. A terminal device may directly determine, according to an indication of a network device, UCI to be transmitted on a physical uplink channel. FIG. 8 is a flowchart of a communication method 800 according to another embodiment of this application from a perspective of device interaction.

As shown in FIG. 8, the method 800 includes steps 810 to 840.

Step 810: A terminal device receives third indication information, where the third indication information indicates UCI to be transmitted by the terminal device.

Correspondingly, a network device sends the third indication information, where the third indication information indicates UCI to be transmitted by the terminal device on a physical uplink channel.

Specifically, the third indication information may be information carried in higher layer signaling, for example, an RRC message or a MAC CE. Alternatively, the third indication information may be information, for example, DCI, carried in physical layer signaling. The third indication information may indicate, by using a newly added field in the higher layer signaling or the physical layer signaling, the UCI to be transmitted by the terminal device on the physical uplink channel.

For example, when the newly added field is set to “0”, it may indicate that only UCI is to be transmitted on the physical uplink channel, and a quantity of bits of UCI that can be transmitted is directly indicated. When the newly added field is set to “1”, it may indicate that UCI and uplink data are to be transmitted on the physical uplink channel, and quantities of bits of UCI and uplink data that can be transmitted are directly indicated. Alternatively, when the newly added field is set to “00”, it may indicate that only UCI is to be transmitted on the physical uplink channel, and a quantity of bits of UCI that can be transmitted is directly indicated. When the newly added field is set to “01”, it may indicate that UCI and uplink data are to be transmitted on the physical uplink channel, and quantities of bits of UCI and uplink data that can be transmitted are directly indicated. When the newly added field is set to “10”, it may indicate that uplink data is to be transmitted on the physical uplink channel, and a quantity of bits of uplink data that can be transmitted is directly indicated. The newly added field is in a reserved state when set to “11”.

It should be understood that the signaling that carries the third indication information, the field that carries the third indication information, and the specific manner of indicating, by using the foregoing enumerated field, whether only UCI is to be transmitted on the physical uplink channel that are enumerated above are merely examples for description, and should not constitute any limitation on this application. For example, the first indication information may alternatively be indicated by using another existing field. This is not limited in this application.

Step 820: When the third indication information indicates a quantity of bits of UCI that can be transmitted on the physical uplink channel, the terminal device and the network device determine that only the indicated quantity of bits of the UCI is to be transmitted on the physical uplink channel.

Step 830: The terminal device sends only the indicated quantity of bits of the UCI on the physical uplink channel, and correspondingly, the network device receives only the UCI on the physical uplink channel.

It should be understood that a specific process of step 820 is the same as the specific process of step 740 in the foregoing method 700. For brevity, details are not described herein again.

Optionally, the method 800 further includes step 840: When the third indication information indicates that not only UCI is to be transmitted on the physical uplink channel, the terminal device sends the UCI and uplink data on the physical uplink channel, or sends uplink data.

Correspondingly, step 840: When the third indication information indicates that not only UCI is to be transmitted on the physical uplink channel, the network device receives the UCI and uplink data on the physical uplink channel, or receives uplink data.

It should be understood that a specific process of step 840 is the same as a specific process of step 760 in the foregoing method 700. In which case the terminal device may send the UCI and the uplink data and in which case the terminal device may send only the uplink data are described above with reference to specific cases. For brevity, details are not described herein.

According to the foregoing technical solutions, the terminal device may determine, according to an indication of the network device, content to be transmitted on the physical uplink channel, and the network device may also receive the corresponding content on the physical uplink channel according to the same indication. Therefore, the network device can correctly receive the UCI and/or the uplink data. This helps improve data transmission reliability, and therefore helps improve transmission performance of a communications system.

It should be understood that the communication method provided in this embodiment of this application is described in detail above merely for ease of understanding by using interaction between the network device and the terminal device as an example, but this should not constitute any limitation on this application. For example, a network device that sends information about a configuration parameter to the terminal device and a network device that receives the UCI may be a same network device or different network devices. This is not limited in this application.

It should be further understood that sequence numbers of the processes do not mean execution sequences in various embodiments of this application. The execution sequences of the processes should be determined according to functions and internal logic of the processes, and should not constitute any limitation on the implementation processes of the embodiments of this application.

The foregoing describes in detail the communication method in the embodiments of this application with reference to FIG. 7 and FIG. 8. The following describes in detail a communications apparatus in the embodiments of this application with reference to FIG. 9 to FIG. 12.

Figure 9:
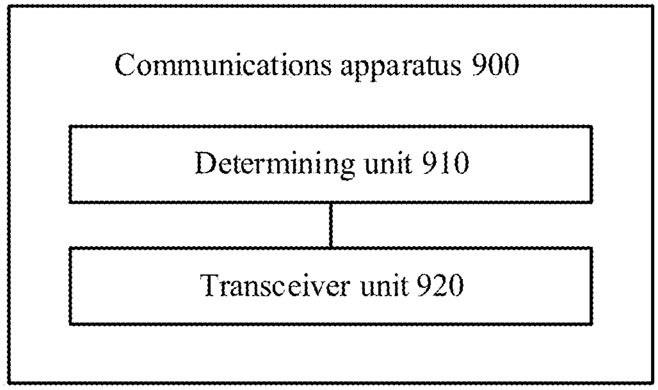
FIG. 9 is a schematic block diagram of a communication apparatus according to an embodiment of this application.

FIG. 9 is a schematic block diagram of a communications apparatus according to an embodiment of this application. As shown in FIG. 9, the communications apparatus 900 may include a determining unit 910 and a transceiver unit 920.

In a possible design, the communications apparatus 900 may be a terminal device or a chip configured in a terminal device.

In a possible implementation, the determining unit 910 may be configured to determine a threshold code rate according to a modulation and coding scheme MCS index.

The determining unit 910 may be further configured to: determine a quantity of bits of to-be-transmitted UCI according to the threshold code rate and a quantity of generated bits of the UCI, where the quantity of bits of the to-be-transmitted UCI is less than or equal to the quantity of generated bits of the UCI.

The transceiver unit 920 is configured to send the quantity of bits of the to-be-transmitted UCI.

Optionally, the determining unit 910 may be specifically configured to: determine, when the MCS index falls within a first range, a first code rate according to a predefined one-to-one correspondence between the MCS index and the first code rate, and determine the first code rate as the threshold code rate; or determine the threshold code rate according to the first code rate and an offset β, where the offset β is greater than or equal to 1.

Optionally, the determining unit 910 may be further configured to: determine, when the MCS index falls within a second range, a modulation order according to the MCS index, and determine a first code rate according to a correspondence between the modulation order and the first code rate, and determine the first code rate as the threshold code rate; or determine the threshold code rate according to the first code rate and an offset β, where the offset β is greater than or equal to 1.

In a possible implementation, if the modulation order corresponds to a plurality of first code rates, the determining unit 910 may be configured to determine a largest code rate in the plurality of first code rates as the first code rate. Alternatively, if the modulation order corresponds to a plurality of first code rates, the determining unit 910 may be configured to determine a smallest code rate in the plurality of first code rates as the first code rate. Alternatively, if the modulation order corresponds to a plurality of first code rates, the determining unit 910 may be configured to determine the first code rate according to first indication information, where the first indication information is information carried in downlink control information DCI.

Alternatively, when the MCS index falls within a second range, the determining unit 910 may be configured to: determine a first code rate according to a predefined one-to-one correspondence between the MCS index and the first code rate, and determine the first code rate as the threshold code rate; or determine the threshold code rate according to the first code rate and an offset β, where the offset β is greater than or equal to 1.

Optionally, the determining unit 910 may be further configured to determine whether only the UCI is to be transmitted on the physical uplink channel.

Specifically, the determining unit 910 may determine, according to second indication information, whether only the UCI is to be transmitted on the physical uplink channel, where the second indication information is information carried in the DCI, or determine, according to the MCS index, a redundancy version (RV) indicator, and a new data indicator (NDI), whether only the UCI is to be transmitted on the physical uplink channel.

It should be understood that the communications apparatus 900 may correspond to the terminal device or the network device in the communication method 700 in the embodiments of this application. The communications apparatus 900 may include a module configured to perform the method performed by the terminal device or the network device in the communication method 700 in FIG. 7. In addition, the modules in the communications apparatus 900 and the foregoing other operations and/or functions are separately to implement a corresponding procedure of the communication method 700 in FIG. 7. Specifically, the determining unit 910 is configured to perform step 720, step 730, and step 740 in the method 700, the transceiver unit 920 is configured to perform step 710, 750, or 760 in the method 700. A specific process in which each unit performs the foregoing corresponding step has been described in detail in the method 700. For brevity, details are not described herein again.

Specifically, the communications apparatus 900 may correspond to the terminal device in the communication method 800 in the embodiments of this application. The communications apparatus 900 may include a module configured to perform the method performed by the terminal device in the communication method 800 in FIG. 8. In addition, the modules in the communications apparatus 900 and the foregoing other operations and/or functions are separately to implement a corresponding procedure of the communication method 800 in FIG. 8. Specifically, the transceiver unit 920 is configured to perform step 520 in the method 800. A specific process in which each unit performs the foregoing corresponding step has been described in detail in the method 800. For brevity, details are not described herein again.

In another possible design, the communications apparatus 900 may be a terminal device or a chip configured in a terminal device.

Figure 10:
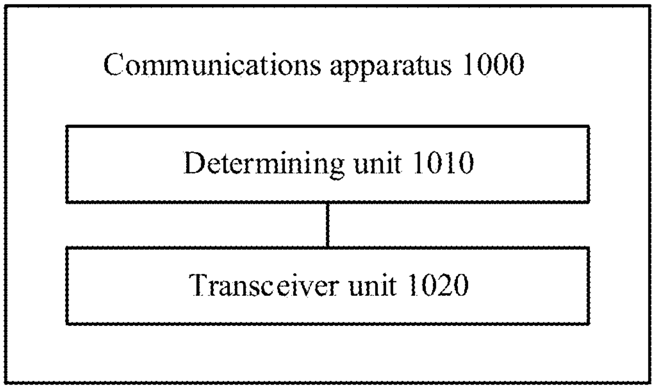
FIG. 10 is a schematic block diagram of another communication apparatus according to an embodiment of this application.

FIG. 10 is a schematic block diagram of a communications apparatus according to an embodiment of this application. As shown in FIG. 10, the communications apparatus 1000 may include a determining unit 1010 and a transceiver unit 1020.

In a possible design, the communications apparatus 1000 may be a network device or a chip configured in a network device.

In a possible implementation, the determining unit 1010 may be configured to determine a threshold code rate according to a modulation and coding scheme MCS index.

The determining unit 1010 may be further configured to: determine a quantity of bits of to-be-transmitted UCI according to the threshold code rate and a quantity of generated bits of the UCI, where the quantity of bits of the to-be-transmitted UCI is less than or equal to the quantity of generated bits of the UCI.

The transceiver unit 1020 is configured to send the quantity of bits of the to-be-transmitted UCI.

Optionally, the determining unit 1010 may be specifically configured to: determine, when the MCS index falls within a first range, a first code rate according to a predefined one-to-one correspondence between the MCS index and the first code rate, and determine the first code rate as the threshold code rate; or determine the threshold code rate according to the first code rate and an offset β, where the offset β is greater than or equal to 1.

Optionally, the determining unit 1010 may be further configured to: determine, when the MCS index falls within a second range, a modulation order according to the MCS index, and determine a first code rate according to a correspondence between the modulation order and the first code rate, and determine the first code rate as the threshold code rate; or determine the threshold code rate according to the first code rate and an offset β, where the offset β is greater than or equal to 1.

In a possible implementation, if the modulation order corresponds to a plurality of first code rates, the determining unit 1010 may be configured to determine a largest code rate in the plurality of first code rates as the first code rate. Alternatively, if the modulation order corresponds to a plurality of first code rates, the determining unit 1010 may be configured to determine a smallest code rate in the plurality of first code rates as the first code rate. Alternatively, if the modulation order corresponds to a plurality of first code rates, the determining unit 1010 may be configured to determine the first code rate according to first indication information, where the first indication information is information carried in downlink control information DCI.

Alternatively, when the MCS index falls within a second range, the determining unit 1010 may be configured to: determine a first code rate according to a predefined one-to-one correspondence between the MCS index and the first code rate, and determine the first code rate as the threshold code rate; or determine the threshold code rate according to the first code rate and an offset β, where the offset β is greater than or equal to 1.

Optionally, the determining unit 1010 may be further configured to determine whether only the UCI is to be transmitted on the physical uplink channel.

Specifically, the determining unit 1010 may determine, according to second indication information, whether only the UCI is to be transmitted on the physical uplink channel, where the second indication information is information carried in the DCI, or determine, according to the MCS index, a redundancy version (RV) indicator, and a new data indicator (NDI), whether only the UCI is to be transmitted on the physical uplink channel.

It should be understood that the communications apparatus 1000 may correspond to the network device in the communication method 700 in the embodiments of this application. The communications apparatus 1000 may include a module configured to perform the method performed by the network device in the communication method 700 in FIG. 7. In addition, the modules in the communications apparatus 1000 and the foregoing other operations and/or functions are separately to implement a corresponding procedure of the communication method 700 in FIG. 7. Specifically, the determining unit 1010 is configured to perform step 720, step 730, and step 740 in the method 700, the transceiver unit 1020 is configured to perform step 710, 750, or 760 in the method 700. A specific process in which each unit performs the foregoing corresponding step has been described in detail in the method 700. For brevity, details are not described herein again.

Specifically, the communications apparatus 1000 may correspond to the network device in the communication method 800 in the embodiments of this application. The communications apparatus 1000 may include a module configured to perform the method performed by the network device in the communication method 800 in FIG. 8. In addition, the modules in the communications apparatus 1000 and the foregoing other operations and/or functions are separately to implement a corresponding procedure of the communication method 800 in FIG. 8. Specifically, the transceiver unit 1020 is configured to perform step 520 in the method 800. A specific process in which each unit performs the foregoing corresponding step has been described in detail in the method 800. For brevity, details are not described herein again.

In another possible design, the communications apparatus 1000 may be a network device or a chip configured in a network device.

Figure 11:
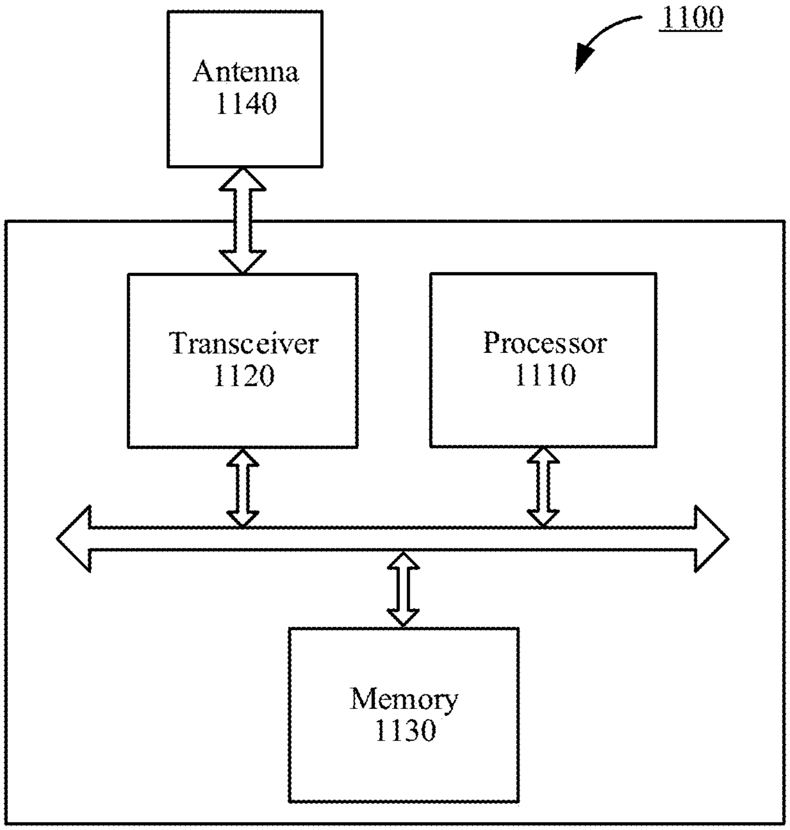
FIG. 11 is a schematic block diagram of a terminal device according to an embodiment of this application.

FIG. 11 is a schematic structural diagram of a terminal device 1100 according to an embodiment of this application. As shown in FIG. 11, the terminal device 1100 includes a processor 1110 and a transceiver 1120. Optionally, the terminal device 1100 further includes a memory 1130. The processor 1110, the transceiver 1120, and the memory 1130 communicate with each other through an internal connection channel to transmit a control signal and/or a data signal. The memory 1130 is configured to store a computer program. The processor 1110 is configured to invoke the computer program from the memory 1130 and run the computer program to control the transceiver 1120 to receive and send a signal.

The processor 1110 and the memory 1130 may be integrated into one processing apparatus. The processor 1110 is configured to execute program code stored in the memory 1130 to implement the foregoing functions. In specific implementation, the memory 1130 may alternatively be integrated into the processor 1110, or may be independent of the processor 1110.

The terminal device may further include an antenna 1140, and the antenna 1140 is configured to send, by using a radio signal, downlink data or downlink control signaling output by the transceiver 1120.

Specifically, the terminal device 1100 may correspond to the terminal device in the communication method 700 in the embodiments of this application. The terminal device 1100 may include a module configured to perform the method performed by the terminal device in the communication method 700 in FIG. 7. In addition, the modules in the terminal device 1100 and the foregoing other operations and/or functions are separately to implement a corresponding procedure of the communication method 700 in FIG. 7. Specifically, the memory 1130 is configured to store program code, so that when executing the program code, the processor 1110 performs step 720, step 730, and step 740 in the method 700, and controls the transceiver 1120 to perform step 710, step 750, or step 760 in the method 700 by using the antenna 1140. A specific process of performing the foregoing corresponding step by each module has been described in detail in the method 700. For brevity, details are not described herein again.

Alternatively, the terminal device 1100 may correspond to the terminal device in the communication method 800 in the embodiments of this application. The terminal device 1100 may include a module configured to perform the method performed by the terminal device in the communication method 800 in FIG. 8. In addition, the modules in the terminal device 1100 and the foregoing other operations and/or functions are separately to implement a corresponding procedure of the communication method 800 in FIG. 8. Specifically, the memory 1150 is configured to store program code, so that when executing the program code, the processor 1110 performs step 820 in the method 800, and controls the transceiver 1120 to perform step 810, step 830, or step 840 in the method 800 by using the antenna 1140. A specific process of performing the foregoing corresponding step by each module has been described in detail in the method 800. For brevity, details are not described herein again.

Figure 12:
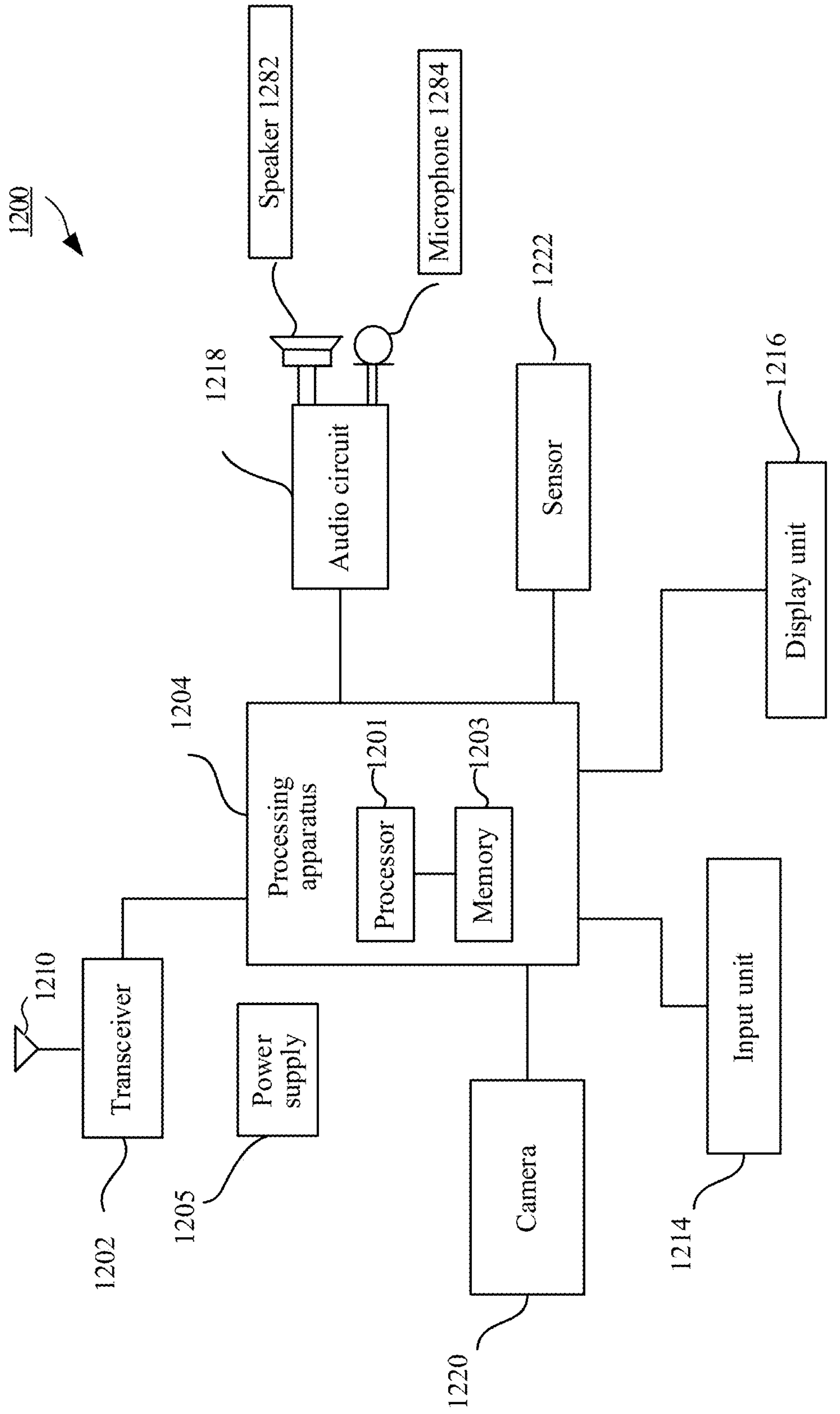
FIG. 12 is structural block diagram of an example of a terminal device according to an embodiment of this application.

FIG. 12 is a schematic structural diagram of a terminal device 1200 according to an embodiment of this application. As shown in FIG. 12, the terminal device 1200 includes a processor 1201 and a transceiver 1202. Optionally, the terminal device 1200 further includes a memory 1203. The processor 1201, the transceiver 1202, and the memory 1203 communicate with each other through an internal connection channel to transmit a control signal and/or a data signal. The memory 1203 is configured to store a computer program. The processor 1201 is configured to invoke the computer program from the memory 1203 and run the computer program to control the transceiver 1202 to receive and send a signal.

The processor 1201 and the memory 1203 may be integrated into one processing apparatus 1204. The processor 1201 is configured to execute program code stored in the memory 1203 to implement the foregoing functions. In specific implementation, the memory 1203 may alternatively be integrated into the processor 1201, or may be independent of the processor 1201. The terminal device 1200 may further include an antenna 1210, and the antenna 1210 is configured to send, by using a radio signal, uplink data or uplink control signaling output by the transceiver 1202.

Specifically, the terminal device 1200 may correspond to the terminal device in the communication method 700 in the embodiments of this application. The terminal device 1200 may include a module configured to perform the method performed by the terminal device in the communication method 700 in FIG. 7. In addition, the modules in the terminal device 1200 and the foregoing other operations and/or functions are separately to implement a corresponding procedure of the communication method 700 in FIG. 7. Specifically, the memory 1203 is configured to store program code, so that when executing the program code, the processor 1201 performs step 720 to step 740 in the method 700, and controls the transceiver 1202 to perform step 710, step 750, or step 760 in the method 700. A specific process of performing the foregoing corresponding step by each module has been described in detail in the method 700. For brevity, details are not described herein again.

Alternatively, the terminal device 1200 may correspond to the terminal device in the communication method 800 in the embodiments of this application. The terminal device 1200 may include a module configured to perform the method performed by the terminal device in the communication method 800 in FIG. 8. In addition, the modules in the terminal device 1200 and the foregoing other operations and/or functions are separately to implement a corresponding procedure of the communication method 800 in FIG. 8. Specifically, the memory 1203 is configured to store program code, so that when executing the program code, the processor 1201 performs the method 800, and controls the transceiver 1202 to perform step 810, step 830, or step 840 in the method 800. A specific process of performing the foregoing corresponding step by each module has been described in detail in the method 800. For brevity, details are not described herein again.

The processor 1201 may be configured to perform an action that is internally implemented by a terminal and that is described in the foregoing method embodiments, and the transceiver 1202 may be configured to perform an action of transmission or sending that is performed by the terminal to the terminal device and that is described in the foregoing method embodiments. For details, refer to the descriptions in the foregoing method embodiments. Details are not described herein.

The processor 1201 and the memory 1203 may be integrated into one processing apparatus. The processor 1201 is configured to execute program code stored in the memory 1203 to implement the foregoing functions. In specific implementation, the memory 1203 may alternatively be integrated into the processor 1201.

The terminal device 1200 may further include a power supply 1205, configured to supply power to various components or circuits in the terminal.

In addition, the terminal device 1200 may further include one or more of an input unit 1214, a display unit 1216, an audio circuit 1218, a camera 1220, and a sensor 1222, to further improve functions of the terminal device. The audio circuit may further include a speaker 1282, a microphone 1284, and the like.

Figure 13:
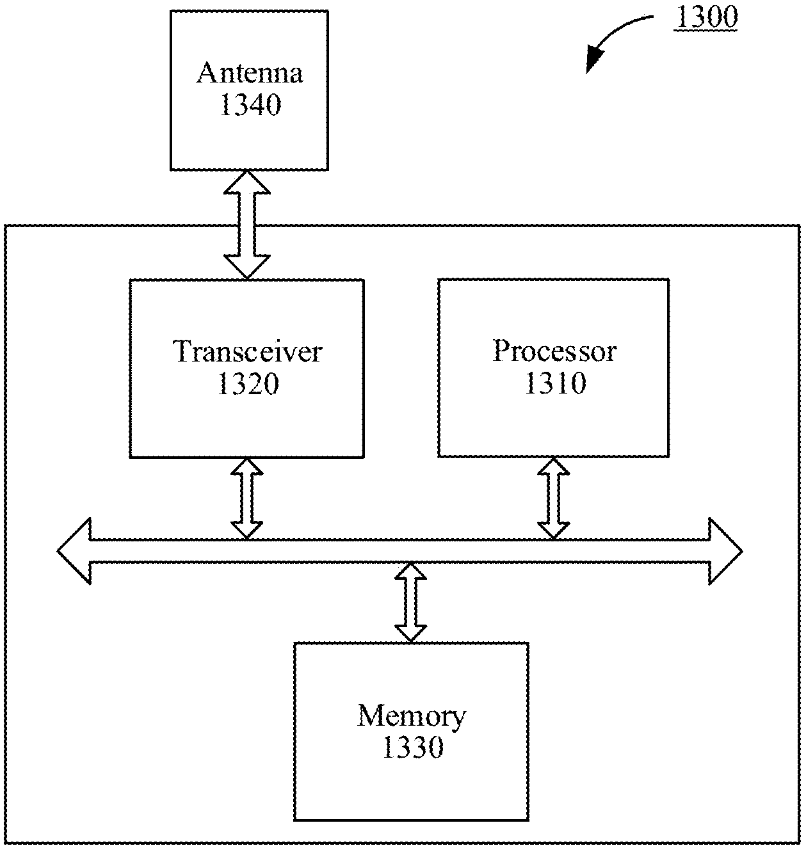
FIG. 13 is a schematic block diagram of a network device according to an embodiment of this application.

FIG. 13 is a schematic structural diagram of a network device 1300 according to an embodiment of this application. As shown in FIG. 13, the network device 1300 includes a processor 1310 and a transceiver 1320. Optionally, the network device 1300 further includes a memory 1330. The processor 1310, the transceiver 1320, and the memory 1330 communicate with each other through an internal connection channel to transmit a control signal and/or a data signal. The memory 1330 is configured to store a computer program. The processor 1310 is configured to invoke the computer program from the memory 1330 and run the computer program to control the transceiver 1320 to receive and send a signal.

The processor 1310 and the memory 1330 may be integrated into one processing apparatus. The processor 1310 is configured to execute program code stored in the memory 1330 to implement the foregoing functions. In specific implementation, the memory 1330 may alternatively be integrated into the processor 1310, or may be independent of the processor 1310.

The network device may further include an antenna 1340, and the antenna 1340 is configured to send, by using a radio signal, downlink data or downlink control signaling output by the transceiver 1320.

Specifically, the network device 1300 may correspond to the network device in the communication method 700 in the embodiments of this application. The network device 1300 may include a module configured to perform the method performed by the network device in the communication method 700 in FIG. 7. In addition, the modules in the network device 1300 and the foregoing other operations and/or functions are separately to implement a corresponding procedure of the communication method 700 in FIG. 7. Specifically, the memory 1330 is configured to store program code, so that when executing the program code, the processor 1310 performs step 720, step 730, and step 740 in the method 700, and controls the transceiver 1320 to perform step 710, step 750, or step 760 in the method 700 by using the antenna 1340. A specific process of performing the foregoing corresponding step by each module has been described in detail in the method 700. For brevity, details are not described herein again.

Alternatively, the network device 1300 may correspond to the network device in the communication method 800 in the embodiments of this application. The network device 1300 may include a module configured to perform the method performed by the network device in the communication method 800 in FIG. 8. In addition, the modules in the network device 1300 and the foregoing other operations and/or functions are separately to implement a corresponding procedure of the communication method 800 in FIG. 8. Specifically, the memory 1350 is configured to store program code, so that when executing the program code, the processor 1310 performs step 820 in the method 800, and controls the transceiver 1320 to perform step 810, step 830, or step 840 in the method 800 by using the antenna 1340. A specific process of performing the foregoing corresponding step by each module has been described in detail in the method 800. For brevity, details are not described herein again.

Figure 14:
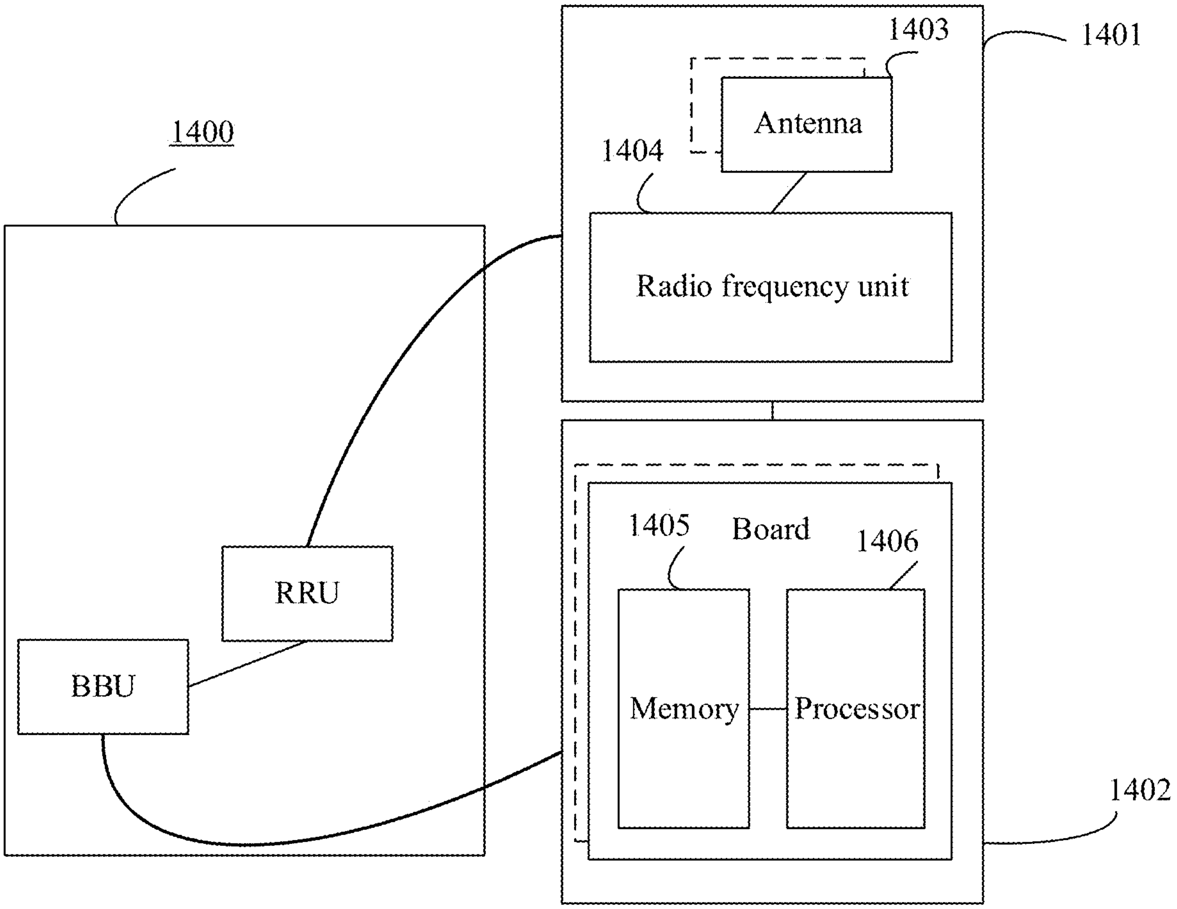
FIG. 14 is schematic structural block diagram of a network device according to an embodiment of this application.

FIG. 14 is a schematic structural diagram of a network device 1400 according to an embodiment of this application. The network device 1400 may be configured to implement functions of the network device in the method 700 or 800 in the foregoing method. For example, FIG. 14 may be a schematic structural diagram of a base station. As shown in FIG. 14, the base station may be applied to the system shown in FIG. 1. The base station 1400 includes one or more radio frequency units, such as a remote radio unit (RRU) 1401 and one or more baseband units (BBUs) (also referred to as digital units, DUs) 1402. The RRU 1401 may be referred to as a transceiver unit, a transceiver machine, a transceiver circuit, a transceiver, or the like, and may include at least one antenna 1403 and a radio frequency unit 1404. The RRU 1401 is mainly configured to perform receiving and sending of a radio frequency signal and conversion between a radio frequency signal and a baseband signal, for example, send the signaling message in the foregoing embodiments to a terminal device. The BBU 1402 is mainly configured to: perform baseband processing, control the base station, and so on. The RRU 1401 and the BBU 1402 may be physically disposed together, or may be physically disposed separately, to be specific, in a distributed base station.

The BBU 1402 is a control center of the base station, or may be referred to as a processing unit, and is mainly configured to complete baseband processing functions such as channel coding, multiplexing, modulation, and spectrum spreading. For example, the BBU (the determining unit) 1402 may be configured to control the base station 1400 to perform an operation procedure related to the network device in the embodiment of the foregoing method 700 or 800.

In an example, the BBU 1402 may include one or more boards, and a plurality of boards may together support a radio access network (for example, an LTE system or an NR system) of a single access standard, or may separately support radio access networks of different access standards. The BBU 1402 further includes a memory 1405 and a processor 1406. The memory 1405 is configured to store a necessary instruction and necessary data. For example, the memory 1405 stores the codebook and the like in the foregoing embodiments. The processor 1406 is configured to control the base station to perform a necessary action, for example, control the base station to perform an operation procedure related to the network device in the foregoing method embodiments. The memory 1405 and the processor 1406 may serve one or more boards. In other words, a memory and a processor may be separately disposed on each board. Alternatively, a plurality of boards may share a same memory and a same processor. In addition, each board may further be provided with a necessary circuit.

In a possible implementation, with development of a system-on-chip (SoC) technology, all or some functions of the components 1402 and 1401 may be implemented by using the SoC technology, for example, implemented by using one base station function chip. The base station function chip integrates components such as a processor, a memory, and an antenna port. A program of a base station-related function is stored in the memory. The processor executes the program to implement the base station-related function. Optionally, the base station function chip can also read a memory outside the chip to implement the base station-related function.

It should be understood that the structure of the base station shown in FIG. 14 is merely a possible form, but should not constitute any limitation on this embodiment of this application. In this application, a possibility that there may be a base station structure in another form in the future is not excluded.

According to the method provided in the embodiments of this application, an embodiment of this application further provides a communications system. The system includes the foregoing network device and one or more terminal devices.

It should be understood that in the embodiments of this application, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

It should be further understood that the memory in the embodiments of this application may be a transitory memory or a non-transitory memory, or may include both a transitory memory and a non-transitory memory. The non-transitory memory may be a read-only memory (ROM), a programmable read-only memory (PROM), an erasable programmable read-only memory (EPROM), an electrically erasable programmable read-only memory (EEPROM), or a flash memory. The transitory memory may be a random access memory (RAM), used as an external cache. Through example but not limitative description, many forms of RAM are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM).

According to the method provided in the embodiments of this application, this application further provides a computer program product, and the computer program product includes computer program code. When the computer program code runs on a computer, the computer is enabled to perform the method in the embodiment shown in FIG. 7 or FIG. 8.

According to the method provided in the embodiments of this application, this application further provides a computer readable medium, and the computer readable medium stores program code. When the program code runs on a computer, the computer is enabled to perform the method in the embodiment shown in FIG. 7 or FIG. 8.

According to the method provided in the embodiments of this application, this application further provides a system. The system includes the foregoing network device and one or more terminal devices. All or some of the foregoing embodiments may be implemented by means of software, hardware, firmware, or any combination thereof. When software is used to implement the embodiments, the foregoing embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instruction may be stored in a computer readable storage medium, or may be transmitted from one computer readable storage medium to another computer readable storage medium. For example, the computer instruction may be transmitted from one website, computer, server, or data center to another website, computer, server, or data center in a wired (for example, infrared, radio, or microwave) manner. The computer readable storage medium may be any usable medium accessible by the computer, or a data storage device, such as a server or a data center, including one or more usable medium sets. The usable medium may be a magnetic medium (for example, a floppy disk, a hard disk, or a magnetic tape), an optical medium (for example, a DVD), or a semiconductor medium. The semiconductor medium may be a solid-state drive.

Units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A different method may be used to implement the described functions for each particular application, but it should not be considered that the implementation goes beyond the scope of this application.

For the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored, or not executed. In addition, the displayed or discussed mutual couplings or direct couplings or communication connections may be implemented by using some interfaces. The indirect couplings or communication connections between the apparatuses or units may be implemented in an electrical form, a mechanical form, or another form.

The units described as separate parts may or may not be physically separate, and parts displayed as units may or may not be physical units, in other words, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software function unit and sold or used as an independent product, the functions may be stored in a computer readable storage medium. According to such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement that can be readily figured out within the technical scope disclosed in this application shall fall within the protection scope of this application. Therefore, the protection scope of this application shall be subject to the protection scope of the claims.

What is claimed is:

1. A method, comprising:

determining that channel state information (CSI) part 2 comprising a first quantity of bits is to be transmitted on a physical uplink shared channel (PUSCH) without uplink data;

determining a threshold code rate according to a first code rate and an offset value β, wherein the offset value β is greater than 1, wherein the first code rate is determined according to a modulation and coding scheme (MCS) index within a range;

determining a second quantity of bits of the CSI part 2 according to the threshold code rate and the first quantity of bits of the CSI part 2, wherein the second quantity of bits of the CSI part 2 satisfies:

$$\frac{A-A0}{Q'_{CSI\text{-}part2}*M}<\frac{c_{ref}}{\beta}$$

wherein A−A0 represents the second quantity of bits of the CSI part 2, A represents the first quantity of bits of the CSI part 2, A0 represents a quantity of discarded bits of the CSI part 2, $$Q'_{CSI-part2}$$

represents a quantity of available resources for the CSI part 2, M represents a modulation order indicated by the MCS index, and $c_{ref}$ represents the first code rate; and outputting the second quantity of bits of the CSI part 2 to be transmitted on the PUSCH.

2. The method according to claim 1, wherein determining the second quantity of bits of the CSI part 2 comprising:

determining that a code rate corresponding to the CSI part 2 is greater than or equal to the threshold code rate, discarding one or more portions of the CSI part 2 sequentially according to discarding priorities of the one or more portions until the code rate corresponding to the CSI part 2 is less than the threshold code rate.

3. The method according to claim 2, wherein an ascending order of the discarding priorities is as follows:

| |
|---|
| Priority 0: |
| Part 2 wideband channel state information, CSI, for CSI reports 1 to $N_{Rep}$ |
| Priority 1: |
| Part 2 subband CSI of even subbands for CSI report 1 |
| Priority 2: |
| Paid 2 subband CSI of odd subbands for CSI report 1 |
| Priority 3: |
| Part 2 subband CSI of even subbands for CSI report 2 |
| Priority 4: |
| Part 2 subband CSI of odd subbands for CSI report 2 |
| . |
| . |
| . |
| Priority $2N_{Rep}-1$: |
| Part 2 subband CSI of even subbands for CSI report $N_{Rep}$ |
| Priority $2N_{Rep}$: |
| Part 2 subband CSI of odd subbands for CSI report $N_{Rep}$ |

wherein $N_{Rep}$ represents the number of CSI reports.

4. The method according to claim 1, wherein the range of the MCS index is greater than or equal to 0 and less than 28.

5. The method according to claim 1, further comprising:

obtaining indication information indicating that no uplink data is to be transmitted on the PUSCH.

6. The method according to claim 5, wherein the indication information comprises an indication field, and the indication field is set to 0 to indicate that no uplink data is to be transmitted on the PUSCH.

7. An apparatus, comprising:

one or more processors to execute instructions causing the apparatus to:

determining that channel state information (CSI) part 2 comprising a first quantity of bits is to be transmitted on a physical uplink shared channel (PUSCH) without uplink data, determine a threshold code rate according to a first code rate and an offset value β, wherein the offset value β is greater than 1, wherein the first code rate is determined according to a modulation and coding scheme (MCS) index within a range;

determine a second quantity of bits of the CSI part 2 according to the threshold code rate and the first quantity of bits of the CSI part 2, wherein the second quantity of bits of the CSI part 2 satisfies:

$$\frac{A-A0}{Q'_{CSI\text{-}part2}*M}<\frac{c_{ref}}{\beta}$$

wherein A−A0 represents the second quantity of bits of the CSI part 2, A represents the first quantity of bits of the CSI part 2, A0 represents a quantity of discarded bits of the CSI part 2, $$Q'_{CSI-part2}$$

represents a quantity of available resources for the CSI part 2, M represents a modulation order indicated by the MCS index, and $c_{ref}$ represents the first code rate; and output the second quantity of bits of the CSI part 2 to be transmitted on the PUSCH.

8. The apparatus according to claim 7, wherein determine the second quantity of bits of the CSI part 2 comprises:

determining that a code rate corresponding to the CSI part 2 is greater than or equal to the threshold code rate, discard one or more portions of the CSI part 2 sequentially according to discarding priorities of the one or more portions until the code rate corresponding to the CSI part 2 is less than the threshold code rate.

9. The apparatus according to claim 8, wherein an ascending order of the discarding priorities is as follows:

| |
|---|
| Priority 0: |
| Part 2 wideband channel state information, CSI, for CSI reports 1 to $N_{Rep}$ |
| Priority 1: |
| Part 2 subband CSI of even subbands for CSI report 1 |
| Priority 2: |
| Part 2 subband CSI of odd subbands for CSI report 1 |
| Priority 3: |
| Part 2 subband CSI of even subbands for CSI report 2 |

-continued

| |
|---|
| Priority 4: |
| Part 2 subband CSI of odd subbands for CSI report 2 |
| . |
| . |
| . |
| Priority $2N_{Rep}-1$: |
| Part 2 subband CSI of even subbands for CSI report $N_{Rep}$ |
| Priority $2N_{Rep}$: |
| Paid 2 subband CSI of odd subbands for CSI report $N_{Rep}$ |

wherein $N_{Rep}$ represents the number of CSI reports.

10. The apparatus according to claim 7, wherein the range of the MCS index is greater than or equal to 0 and less than 28.

11. The apparatus according to claim 7, wherein the apparatus is further caused to obtain indication information indicating that no uplink data is to be transmitted on the PUSCH.

12. The apparatus according to claim 11, wherein the indication information comprises an indication field, and the indication field is set to 0 to indicate that no uplink data is to be transmitted on the PUSCH.

13. A method, comprising:

obtaining channel state information (CSI) part 2 comprising a second quantity of bits from a physical uplink shared channel (PUSCH) that does not carry uplink data, wherein the second quantity of bits of the CSI part 2 is determined according to a threshold code rate and a first quantity of bits of the CSI part 2, the threshold code rate is determined according to a first code rate and an offset value β, wherein the offset value β is greater than 1, the first code rate is determined according to a modulation and coding scheme (MCS) index within a range; and the second quantity of bits of the CSI part 2 satisfies:

$$\frac{A-A0}{Q'_{CSI\text{-}part2}*M}<\frac{c_{ref}}{\beta}$$

wherein A−A0 represents the second quantity of bits of the CSI part 2, A represents the first quantity of bits of the CSI part 2, A0 represents a quantity of discarded bits of the CSI part 2, $$Q'_{CSI-part2}$$

represents a quantity of available resources for the CSI part 2, M represents a modulation order indicated by the MCS index, and $c_{ref}$ represents the first code rate.

14. The method according to claim 13, wherein one or more portions of the CSI part 2 is discarded sequentially according to discarding priorities of the one or more portions until the code rate corresponding to the CSI part 2 is less than the threshold code rate, when a code rate corresponding to the CSI part 2 is greater than or equal to the threshold code rate.

15. The method according to claim 14, wherein an ascending order of the discarding priorities is as follows:

| |
|---|
| Priority 0: |
| Part 2 wideband channel state information, CSI, for CSI reports 1 to $N_{Rep}$ |
| Priority 1: |
| Part 2 subband CSI of even subbands for CSI report 1 |
| Priority 2: |
| Part 2 subband CSI of odd subbands for CSI report 1 |
| Priority 3: |
| Part 2 subband CSI of even subbands for CSI report 2 |
| Priority 4: |
| Part 2 subband CSI of odd subbands for CSI report 2 |
| . . . |
| Priority $2N_{Rep}-1$: |
| Part 2 subband CSI of even subbands for CSI report $N_{Rep}$ |
| Priority $2N_{Rep}$: |
| Part 2 subband CSI of odd subbands for CSI report $N_{Rep}$ |

wherein $N_{Rep}$ represents the number of CSI reports.

16. The method according to claim 13, wherein the range of the MCS index is greater than or equal to 0 and less than 28.

17. The method according to claim 13, further comprising:

outputting indication information indicating that no uplink data is to be carried on the PUSCH.

18. The method according to claim 17, wherein the indication information comprises an indication field, and the indication field is set to 0 to indicate that no uplink data is to be carried on the PUSCH.

19. An apparatus, comprising:

one or more processors to execute instructions causing the apparatus to:

obtain channel state information (CSI) part 2 comprising a second quantity of bits from a physical uplink shared channel (PUSCH) that does not carry uplink data, wherein the second quantity of bits of the CSI part 2 is determined according to a threshold code rate and a first quantity of bits of the CSI part 2, the threshold code rate is determined according to a first code rate and an offset value β, wherein the offset value β is greater than 1, the first code rate is determined according to a modulation and coding scheme (MCS) index within a range; and the second quantity of bits of the CSI part 2 satisfies:

$$\frac{A-A0}{Q'_{CSI\text{-}part2}*M}<\frac{c_{ref}}{\beta}$$

wherein A−A0 represents the second quantity of bits of the CSI part 2, A represents the first quantity of bits of the CSI part 2, A0 represents a quantity of discarded bits of the CSI part 2, $$Q'_{CSI-part2}$$

represents a quantity of available resources for the CSI part 2, M represents a modulation order indicated by the MCS index, and $c_{ref}$ represents the first code rate.

20. The apparatus according to claim 19, wherein one or more portions of the CSI part 2 is discarded sequentially according to discarding priorities of the one or more portions until the code rate corresponding to the CSI part 2 is less than the threshold code rate, when a code rate corresponding to the CSI part 2 is greater than or equal to the threshold code rate.

21. The apparatus according to claim 20, wherein an ascending order of the discarding priorities is as follows:

| |
|---|
| Priority 0: |
| Part 2 wideband channel state information, CSI, for CSI reports 1 to $N_{Rep}$ |
| Priority 1: |
| Part 2 subband CSI of even subbands for CSI report 1 |
| Priority 2: |
| Part 2 subband CSI of odd subbands for CSI report 1 |
| Priority 3: |
| Part 2 subband CSI of even subbands for CSI report 2 |

-continued

| |
|---|
| Priority 4: |
| Part 2 subband CSI of odd subbands for CSI report 2 |
| . |
| . |
| . |
| Priority $2N_{Rep}-1$: |
| Part 2 subband CSI of even subbands for CSI report $N_{Rep}$ |
| Priority $2N_{Rep}$: |
| Part 2 subband CSI of odd subbands for CSI report $N_{Rep}$ |

wherein $N_{Rep}$ represents the number of CSI reports.

22. The apparatus according to claim 19, wherein the range of the MCS index is greater than or equal to 0 and less than 28.

23. The apparatus according to claim 19, wherein the apparatus is further caused to output indication information indicating that no uplink data is to be carried on the PUSCH.

24. The apparatus according to claim 23, wherein the indication information comprises an indication field, and the indication field is set to 0 to indicate that no uplink data is to be carried on the PUSCH.

* * * * *